US008539203B2

United States Patent
Adachi et al.

(10) Patent No.: US 8,539,203 B2
(45) Date of Patent: Sep. 17, 2013

(54) MULTI-THREAD PROCESSOR SELECTING THREADS ON DIFFERENT SCHEDULE PATTERN FOR INTERRUPT PROCESSING AND NORMAL OPERATION

(75) Inventors: Koji Adachi, Kanagawa (JP); Toshiyuki Matsunaga, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 848 days.

(21) Appl. No.: 12/585,737

(22) Filed: Sep. 23, 2009

(65) Prior Publication Data

US 2010/0082944 A1    Apr. 1, 2010

(30) Foreign Application Priority Data

Sep. 30, 2008   (JP) ................................. 2008-252233

(51) Int. Cl.
*G06F 9/46*   (2006.01)
(52) U.S. Cl.
USPC ............................ 712/214; 712/244; 718/107
(58) Field of Classification Search
None
See application file for complete search history.

(56) References Cited

U.S. PATENT DOCUMENTS

| 7,337,443 | B2 * | 2/2008 | Welland et al. ............... 718/102 |
| 7,660,969 | B2 * | 2/2010 | Jensen et al. .................. 712/214 |
| 7,925,869 | B2 * | 4/2011 | Kelsey et al. ................. 712/220 |
| 2006/0123420 | A1 | 6/2006 | Nishikawa | |

FOREIGN PATENT DOCUMENTS

| JP | 2006-155480 | 6/2006 |
| JP | 2007-058331 A | 3/2007 |
| JP | 2007-317171 | 12/2007 |
| JP | 2008-52750 | 3/2008 |

OTHER PUBLICATIONS

Japanese Office Action dated Jul. 10, 2012 (English Translation Thereof).

* cited by examiner

*Primary Examiner* — Kenneth Kim
(74) *Attorney, Agent, or Firm* — McGinn Intellectual Property Law Group, PLLC

(57) ABSTRACT

In an exemplary aspect, the present invention provides a multi-thread processor including a plurality of hardware threads each of which generates an independent instruction flow, a thread scheduler that outputs a thread selection signal in accordance with a first or second schedule, the thread selection signal designating a hardware thread to be executed in a next execution cycle among the plurality of hardware threads, a first selector that selects one of the plurality of hardware threads according to the thread selection signal and outputs an instruction generated by the selected hardware thread, and an execution pipeline that executes an instruction output from the first selector, wherein when the multi-thread processor is in a first state, the thread scheduler selects the first schedule, and when the multi-thread processor is in a second state, the thread scheduler selects the second schedule.

3 Claims, 19 Drawing Sheets

CONFIGURATION OF SCHEDULE

| TIME | COUNT VALUE CNT | SELECTED SLOT | HW THREAD NUMBER | THREAD NUMBER TSEL |
|---|---|---|---|---|
| t1 | 0 | 1 | 0 | 0 |
| t2 | 1 | 2 | 1 | 1 |
| t3 | 2 | 3 | 0 | 0 |
| t4 | 3 | 4 | 2 | 2 |
| t5 | 4 | 5 | 1 | 1 |
| t6 | 0 | 1 | 0 | 0 |
| t7 | 1 | 2 | 1 | 1 |
| t8 | 2 | 3 | 0 | 0 |
| t9 | 3 | 4 | 2 | 2 |

Fig. 5

CONFIGURATION OF SLOT

CONFIGURATION OF SCHEDULE

| TIME | COUNT VALUE CNT | SELECTED SLOT | SCHEDULE SKR11 | | THREAD NUMBER TSEL |
|---|---|---|---|---|---|
| | | | HW THREAD NUMBER | REAL-TIME BIT | |
| t1 | 0 | 1 | 0 | 1 | 0 |
| t2 | 1 | 2 | 1 | 1 | 1 |
| t3 | 2 | 3 | ARBITRARY NUMBER | 0 | m (ARBITRARY NUMBER) |
| t4 | 3 | 4 | 2 | 1 | 2 |
| t5 | 4 | 5 | 1 | 1 | 1 |
| t6 | 0 | 1 | 0 | 1 | 0 |
| t7 | 1 | 2 | 1 | 1 | 1 |
| t8 | 2 | 3 | ARBITRARY NUMBER | 0 | m (ARBITRARY NUMBER) |
| t9 | 3 | 4 | 2 | 1 | 2 |

Fig. 16

MULTI-THREAD PROCESSOR SELECTING THREADS ON DIFFERENT SCHEDULE PATTERN FOR INTERRUPT PROCESSING AND NORMAL OPERATION

BACKGROUND

1. Field of the Invention

The present invention relates to a multi-thread processor.

2. Description of Related Art

In recent years, multi-thread processors have been proposed in order to improve the processing power of processors. A multi-thread processor has a plurality of threads each of which generates an independent instruction flow. Further, the multi-thread processor performs arithmetic processing while changing the instruction flow to be processed in the arithmetic circuit that processes instructions in pipeline processing between a plurality of instruction flows that are generated by the respective plurality of threads. At this point, the multi-thread processor can execute an instruction generated by one thread in one execution stage of the pipeline while executing an instruction generated by another thread in another execution stage. That is, in the arithmetic circuit of the multi-thread processor, instructions that are independent of each other are executed in different execution stages from each other. In this way, the multi-thread processor can process each instruction flow smoothly while reducing the time period during which no instruction is processed in an execution stage of the pipeline, and thus improving the processing power of the processor.

Japanese unexamined Patent Application Publication No. 2007-317171 discloses an example of such a multi-thread processor. The multi-thread processor described in Japanese unexamined Patent Application Publication No. 2007-317171 includes a plurality of processor elements and a parallel processor control unit that switches the thread of each processor element. Further, the parallel processor control unit counts the execution time of the thread being executed in the processor element. Then, when the counted time has reached the allocated time for the thread, it outputs a time-out signal. Then, it switches the thread to be executed by the processor element based on the time-out signal and execution order information retained in an execution order register.

As described above, the instruction flow to be processed in the arithmetic circuit is switched between instruction flows generated by the respective threads in accordance with a schedule in the multi-thread processor. Japanese unexamined Patent Application Publication No. 2008-52750 discloses an example of such a thread scheduling method. In the multi-thread processor described in Japanese unexamined Patent Application Publication No. 2008-52750, a plurality of threads are executed in a circular manner, and each thread is executed for its allocated time in each round. That is, in Japanese unexamined Patent Application Publication No. 2008-52750, a schedule that is established in a fixed manner is executed in a circular manner, so that each thread is executed with a predefined execution time ratio.

Further, Japanese unexamined Patent Application Publication No. 2006-155480 discloses another thread scheduling method. Specifically, Japanese unexamined Patent Application Publication No. 2006-155480 discloses a round-robin method and a priority method as a thread scheduling method. In the round-robin method, threads that are put in a queue are selected and executed one by one at regular intervals. Therefore, in the round-robin method, threads in the queue are impartially assigned to and executed in the CPU at regular intervals. Further, in the priority method, threads are executed in order of their priorities. More specifically, in the priority method, a queue is established for each priority and each thread is put in one of the queues according to its priority. Then, threads are selected, and assigned to and executed in the CPU in descending order of the priority.

SUMMARY

The present inventors have found a following problem. Firstly, in systems that implement real-time processing, capability of performing faster processing in specific situations of the system, such as when interrupt processing occurs, adds value as a system. Note that judging from its configuration, the above described multi-thread processor is a kind of processor that allocates the computing power of the hardware to each thread in a time-sharing manner. However, if a system is constructed with this processor, the computing power of the processor is distributed over the above-described interrupt processing by the multi-thread execution. Therefore, there is a possibility that the processing power required by the system for interrupt processing having a high priority such as communication control of real-time data is not sufficiently obtained, and thereby causing a system error.

To solve such a problem, it is necessary to select an optimal thread schedule for such interrupt processing. Therefore, a process capable of changing the schedule from a schedule for a normal operation to an optimal thread schedule for interrupt processing is required. In this changing process, a process for rewriting a register in which a schedule is stored occurs. However, in interrupt processing in which the presence or absence of several clocks is critical, this process itself in which rewriting of this register and the like are carried out could become significant overhead. Therefore, a configuration of a multi-thread processor capable of coping with such a problem has been desired.

A first exemplary aspect of the present invention is a multi-thread processor including: a plurality of hardware threads each of which generates an independent instruction flow; a thread scheduler that outputs a thread selection signal in accordance with a first schedule or a second schedule, the thread selection signal designating a hardware thread to be executed in a next execution cycle among the plurality of hardware threads; a first selector that selects one of the plurality of hardware threads according to the thread selection signal and outputs an instruction generated by the selected hardware thread; and an execution pipeline that executes an instruction output from the first selector, wherein when the multi-thread processor is in a first state, the thread scheduler selects the first schedule, and when the multi-thread processor is in a second state, the thread scheduler selects the second schedule.

The multi-thread processor in accordance with an exemplary aspect of the present invention includes first and second schedules, and when the state of the processor is changed from the first state to the second state, the multi-thread processor can change the schedule from the first schedule to the second schedule. In this way, when the state of the processor is changed, the processing involving significant overhead such as the schedule rewriting process can be curtailed.

In accordance with a multi-thread processor in accordance with an exemplary aspect of the present invention, when the state of the processor is changed, a thread schedule can be swiftly selected according to that state of the processor.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 5 is a table showing operations of a thread scheduler in accordance with a first exemplary embodiment of the present invention;

FIG. 16 is a table showing operations of a thread scheduler in accordance with a third exemplary embodiment of the present invention;

DETAILED DESCRIPTION OF THE EXEMPLARY EMBODIMENTS

[First Exemplary Embodiment]

Figure 1:
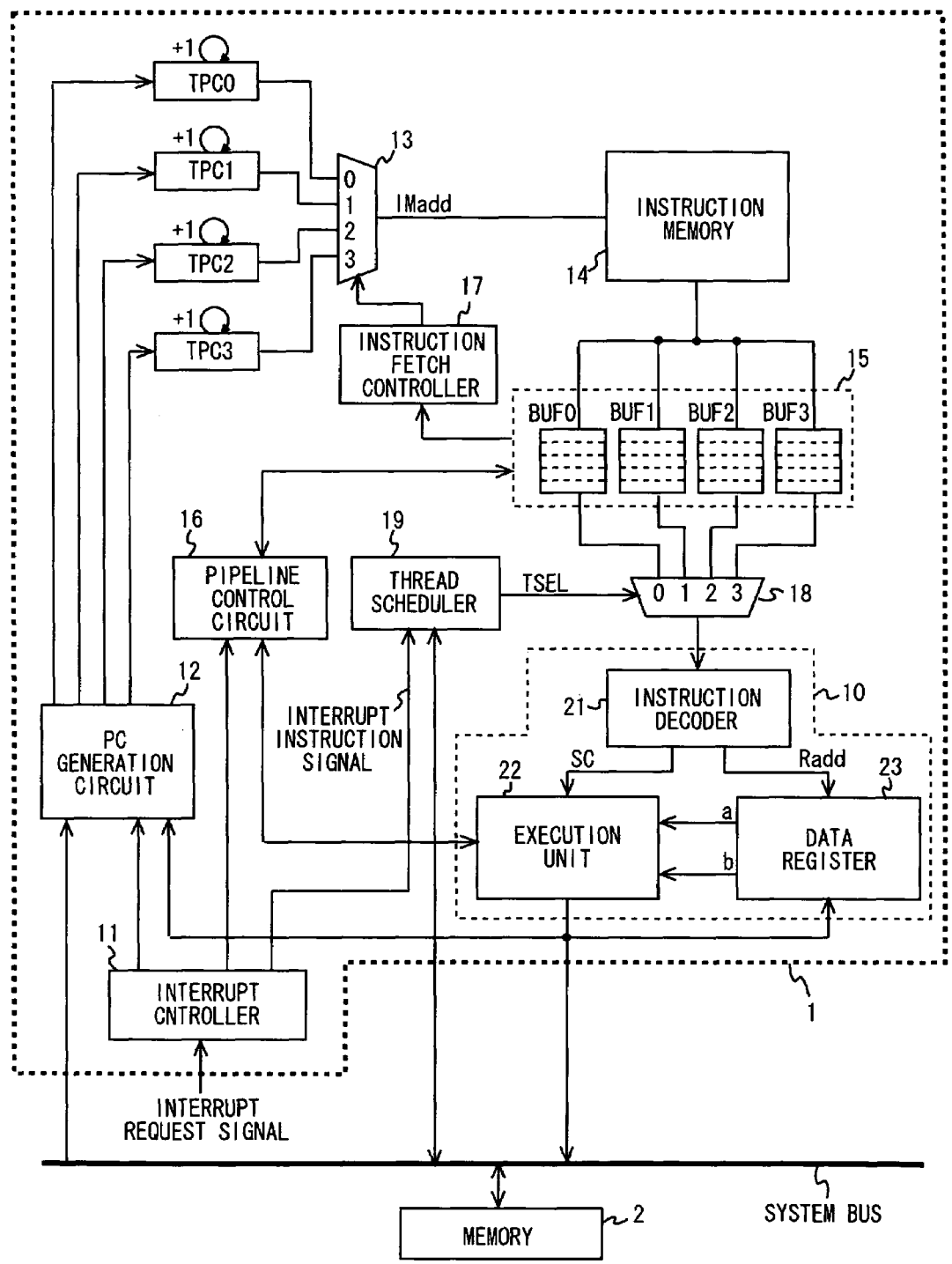
FIG. 1 is a block diagram of a multi-thread processor in accordance with a first exemplary embodiment of the present invention.

A specific first exemplary embodiment to which the present invention is applied is explained hereinafter in detail with reference to the drawings. FIG. 1 is a block diagram of a processor system including a multi-thread processor 1 in accordance with a first exemplary embodiment of the present invention. A multi-thread processor 1 is connected to a memory 2 through a system bus in a processor system in accordance with this exemplary embodiment. Note that though they are not shown in the figure, other circuits such as input/output interfaces are also connected to the system bus.

Firstly, a multi-thread processor 1 in accordance with this exemplary embodiment of the present invention is explained hereinafter. The multi-thread processor 1 includes a plurality of hardware threads. The hardware threads are composed of a group of circuits including thread program counters, an instruction memory, a general register, and a control register (it is assumed to be embedded in a pipeline control circuit 16 in this exemplary embodiment) and the like. Further, the hardware thread is a system that generates an instruction flow composed of a series of instructions that are read out from an instruction memory in accordance with instruction fetch addresses output from a thread program counter embedded in the multi-thread processor 1. That is, instructions contained in an instruction flow generated by one hardware thread are highly relevant to each other. In this exemplary embodiment of the present invention, the multi-thread processor 1 is equipped with a plurality of thread program counters, the number of hardware threads is the number of the thread program counters. Further details of the multi-thread processor 1 are explained hereinafter.

As shown in FIG. 1, the multi-thread processor 1 includes an execution pipeline 10, an interrupt controller 11, a PC generation circuit 12, thread program counters TPC0 to TPC3, selectors 13 and 18, an instruction memory 14, an instruction buffer 15, a pipeline control circuit 16, an instruction fetch controller 17, and a thread scheduler 19.

The execution pipeline 10 executes data processing based on an instruction generated by a hardware thread selected by the selector 18. More specifically, the execution pipeline 10 includes an instruction decoder 21, an execution unit 22, and a data register 23. The instruction decoder 21 decodes a received instruction and outputs an arithmetic control signal SC to the execution unit 22. Further, the instruction decoder 21 also outputs a data register address Radd indicating the storage location of data based on the decoding result of an instruction. The execution unit 22 performs various arithmetic operations according to the arithmetic control signal SC. Note that the execution unit 22 has a plurality of execution stages and performs arithmetic in pipeline processing. Further, an arithmetic result of execution in the execution unit 22 is transmitted to the PC generation circuit 12, the memory 2, or the data register 23 according to the type of the arithmetic operation result. The data register 23 stores data used in the execution unit 22. Further, the data register 23 outputs data located at an address specified by a data register address Radd. In the example shown in FIG. 1, the data register 23 is configured in such a form that it outputs data a and data b according to the data register address Radd. Further, the data register 23 stores an arithmetic operation result output by the execution unit 22 at an address specified by the data register address Radd. Note that the number of execution stages that the execution unit 22 has is at least larger than the number of the above-described hardware threads.

The interrupt controller 11 receives an interrupt request signal, and outputs an interrupt instruction signal instructing the execution of interrupt processing in the multi-thread processor 1. More specifically, upon receiving an interrupt request signal, the interrupt controller 11 determines the interrupt factor and the priority of the interrupt processing and the like, and instructs the PC generation circuit 12, the pipeline control circuit 16, and the thread scheduler 19 to execute interrupt processing so that they carry out processing relevant to that interrupt factor. The interrupt request is also output from other circuits in addition to the one output from the multi-thread processor 1.

The PC generation circuit 12 receives a new program instruction signal input through the system bus, an interrupt instruction signal output from the interrupt controller 11, and a branch instruction signal output based on processing on the execution unit 22, and generates a program count update value. Then, the PC generation circuit 12 provides the program count update value to one of the thread program counters TPC0 to TPC3. Note that the PC generation circuit 12 also has a function of determining which one of the thread program counters TPC0 to TPC3 the generated program count update value is provided to.

The thread program counters TPC0 to TPC3 generate an address in the instruction memory 14 at which an instruction to be processed is stored (hereinafter, this address is referred to as "instruction fetch address IMadd"). Further, when a program count update value is provided from the PC generation circuit 12 to the thread program counters TPC0 to TPC3, the thread program counters TPC0 to TPC3 update the instruction fetch address IMadd according to the program count update value. On the other hand, when no program count update value is input to the thread program counters TPC0 to TPC3, they calculate a next consecutive instruction fetch address by calculating the address in ascending order. Note that although four thread program counters are shown in FIG. 1, the number of program thread counters may be determined arbitrarily according to the specifications of the multi-thread processor.

The selector 13 selects one of the thread program counters TPC0 to TPC3 according to a thread designation signal output from the instruction fetch controller, and outputs the instruction fetch address IMadd output from the selected thread program counter. Note that numerical signs 0 to 3 affixed to the input terminals of the selector 13 in FIG. 1 indicate hardware thread numbers.

The instruction memory 14 is a memory area used in common by a plurality of hardware threads. Various instructions that are to be used in arithmetic operations performed in the multi-thread processor 1 are stored in the instruction memory 14. Furthermore, the instruction memory 14 outputs an instruction specified by an instruction fetch address IMadd input through the selector 13. At this point, the instruction memory 14 determines which one of the thread program counters TPC0 to TPC3 has output the instruction fetch address IMadd selected by the selector 13, and changes the output destination of the instruction based on the determination result. In this exemplary embodiment of the present invention, the instruction buffer 15 includes instruction buffer areas BUF0 to BUF3 corresponding to the thread program counters TPC0 to TPC3. Therefore, the instruction memory 14 distributes the read instruction to one of the instruction buffer areas BUF0 to BUF3 according to the output source of the instruction fetch address IMadd. Note that the instruction memory 14 may be a predefined memory area contained in the memory 2. Further, the instruction buffer areas BUF0 to BUF3 are a FIFO (First In First Out) type buffer circuit. Furthermore, the instruction buffer areas BUF0 to BUF3 may be configured by dividing an area of one buffer, or may be formed in separated areas.

The pipeline control circuit 16 monitors an instruction stored at the top of the instruction buffer 15 and an instruction being executed in the execution unit 22. Further, when an interrupt instruction signal is input from the interrupt controller 11 to the pipeline control circuit 16, the pipeline control circuit 16 instructs the instruction buffer 15 and the execution unit 22 to discard the instruction that belongs to the hardware thread relating to the interrupt processing.

The instruction fetch controller 17 determines which hardware thread the instruction to be fetched belongs to according to the number of instructions stored in the instruction buffer 15, and outputs a thread designation signal based on the determination result. For example, when the number of instructions in the instruction queue stored in the instruction buffer area BUF0 is smaller than those stored in the other instruction buffer areas, the instruction fetch controller 17 determines that the instruction belonging to 0th hardware thread should be fetched and outputs a thread designation signal indicating the 0th hardware thread. Therefore, the selector 13 selects the thread program counter TPC0. Note that the instruction fetch controller 17 may determine a hardware thread to be selected by using procedure based on a round-robin method.

The selector 18 selects one of the instruction buffer areas BUF0 to BUF3 according to a thread selection signal output from the thread scheduler 19, and outputs an instruction read from the selected instruction buffer area to the execution pipeline 10. That is, the selector 18 selects one hardware thread from a plurality of hardware threads according to a thread selection signal TSEL, and outputs an instruction output from the selected hardware thread to the execution pipeline 10. Note that numerical signs 0 to 4 affixed to the input terminals of the selector 18 also indicate hardware thread numbers.

The thread scheduler 19 outputs a thread selection signal TSEL that specifies one hardware thread to be executed in the next execution cycle among a plurality of hardware threads according to a pre-established schedule. That is, the thread scheduler 19 manages in what order a plurality of hardware threads are processed with a schedule. Then, it outputs the thread selection signal TSEL so that instructions generated by hardware threads are executed in the order according to that schedule. Note that when the thread scheduler 19 receives an interrupt instruction signal from the interrupt controller 11, the thread scheduler 19 selects a schedule for interrupt processing according to that interrupt instruction signal. Then, it outputs a thread selection signal based on that schedule for interrupt processing. Further, in a multi-thread processor 1 in accordance with this exemplary embodiment of the present invention, this schedule is established by a management program that is executed immediately after the multi-thread processor 1 is started up.

Figure 2:
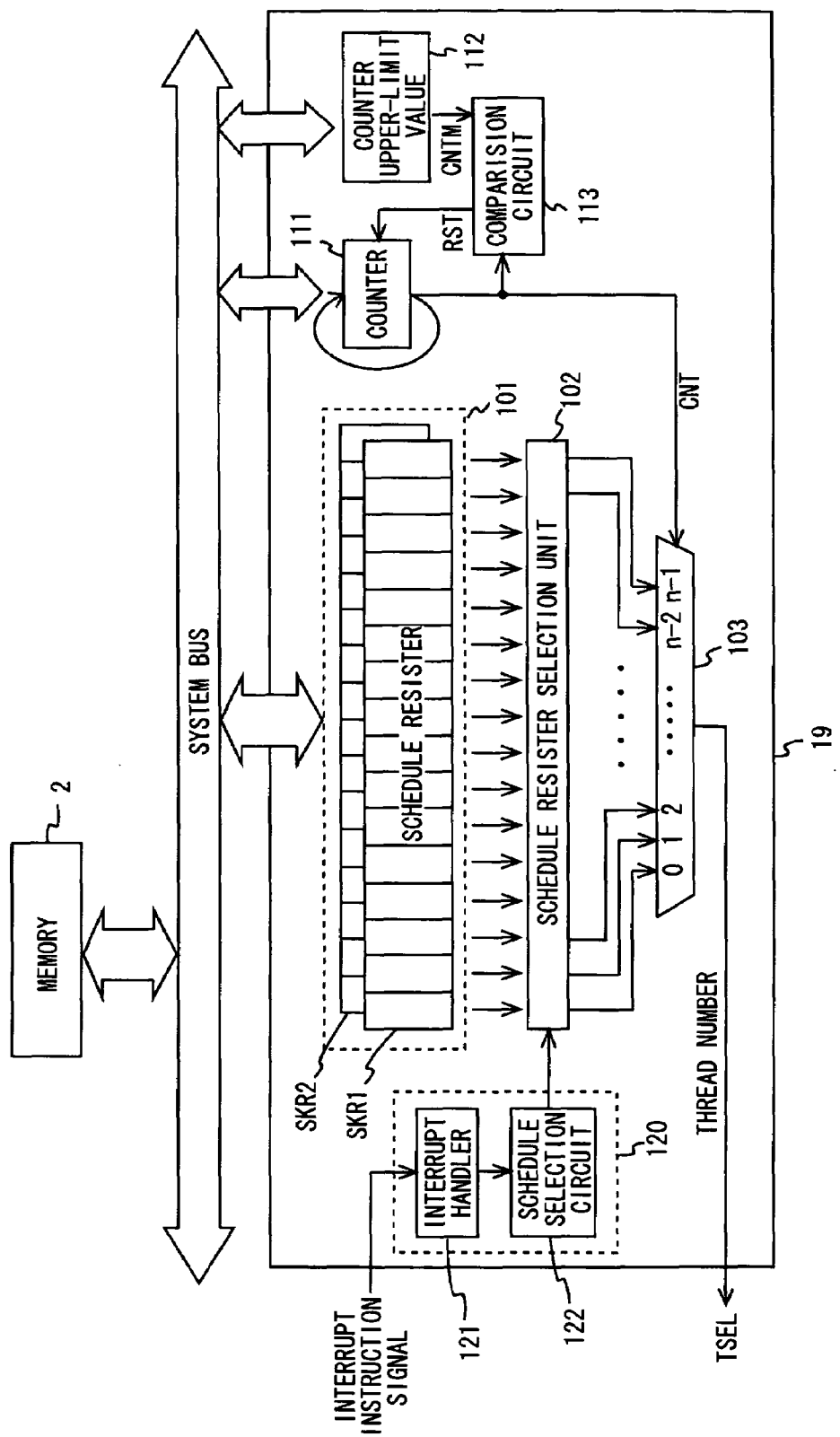
FIG. 2 is a block diagram of a thread scheduler in accordance with a first exemplary embodiment of the present invention.

The multi-thread processor 1 in accordance with this exemplary embodiment of the present invention has a characteristic feature, particularly, in the hardware thread scheduling method performed in the thread scheduler 19. The thread scheduler 19 itself and its scheduling method are explained hereinafter. The thread scheduler 19 is explained hereinafter in detail with reference to the drawings. FIG. 2 shows a block diagram of a thread scheduler 19. As shown in FIG. 2, the thread scheduler 19 (first scheduler) includes a thread control resister unit 101, a schedule register selection unit 102, a selector 103, a counter 111, a counter upper-limit register 112, a match comparison circuit 113, and an interrupt control unit 120.

Figure 3:
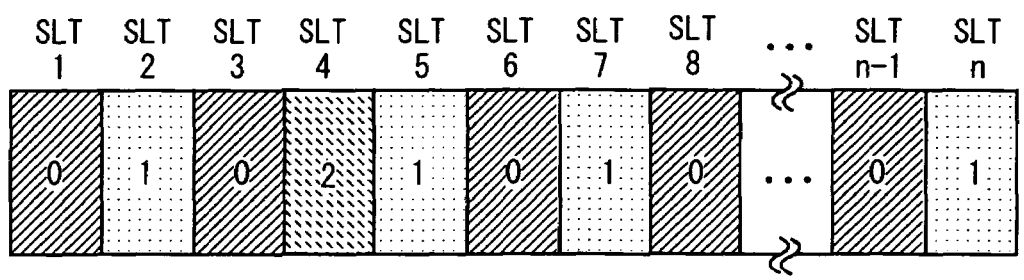
FIG. 3 is a schematic diagram illustrating a configuration of a schedule in accordance with a first exemplary embodiment of the present invention.
Figure 4:
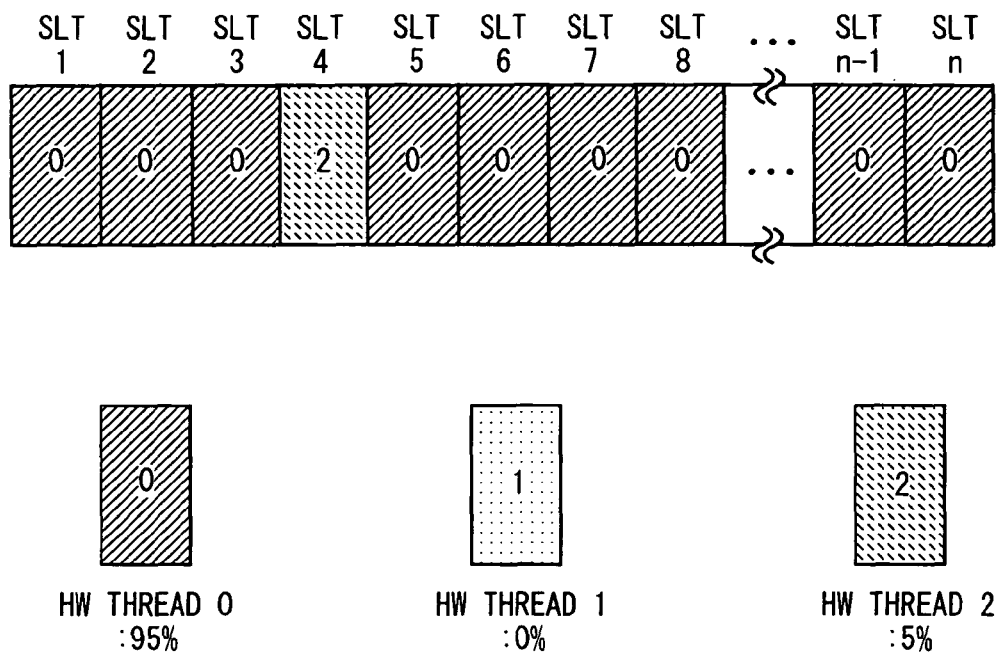
FIG. 4 is a schematic diagram illustrating a configuration of a schedule in accordance with a first exemplary embodiment of the present invention.

The thread control resister unit 101 includes a thread schedule registers SKR1 (first storage portion) and SKR2 (second storage portion). Each of the thread schedule registers SKR1 and SKR2 includes a plurality of slots. Further, the thread schedule registers SKR1 and SKR2 retain the respective schedule patterns. FIGS. 3 and 4 show schematic diagrams of schedule patterns that are stored in the thread schedule registers SKR1 and SKR2 respectively. Note that for the sake of convenience, the sings "SKR1" and "SKR2" are used not only to indicate the names of the respective thread schedule registers but also to indicate the schedule patterns stored in those thread schedule registers. In the following explanation, this is also applied to other thread schedule registers and schedule patterns as the need arises.

As shown in FIG. 3, thread schedule register SKR1 includes n slots (n is an integer equal to or greater than 2) indicated by signs SLT1 to SLTn. Each slot retains a thread number of the respective one of the above-described hardware threads. For example, in this example, the slot SLT1 retains a hardware thread number "0"; the slot SLT2 retains a hardware thread number "1"; the slot SLT3 retains a hardware thread number "0"; and the slot SLT4 retains a hardware thread number "2". The hardware thread numbers retained in these slots SLT1 to SLTn are used as the schedule pattern (schedule SKR1 (first schedule)) of the above-described hardware thread. It is assumed in this example that the occupation ratios of the hardware thread number "0", hardware thread number "1", and hardware thread number "2" in the schedule SKR1 are 40%, 55%, and 5% respectively.

Further, as shown in FIG. 4, similarly to the thread schedule register SKR1, the thread schedule register SKR2 includes n slots indicated by signs SLT1 to SLTn. However, in the thread schedule register SKR2, the slot SLT4 retains a hardware thread number "2", and all the other slots retain a hardware thread number "0". The hardware thread numbers retained in these slots SLT1 to SLTn are used as the schedule pattern (schedule SKR2 (second schedule)). It is assumed in this example that the occupation ratios of the hardware thread number "0" and hardware thread number "1" in the schedule SKR2 are 95% and 0% respectively. Further, the occupation ratio of hardware thread number "2" is 5%, i.e., the same as that of the schedule SKR1.

It is also assumed that a schedule pattern set in the schedule SKR1 is the schedule pattern that is used when the multi-thread processor 1 performs the normal operation (first state). Further, a schedule pattern set in the schedule SKR2 is the schedule pattern that is used when the multi-thread processor 1 performs an interrupt processing operation (second state).

Note that schedule patterns set in the schedules SKR1 and SKR2 are set by a management program that is executed when the multi-thread processor 1 is started up. Further, the management program reads these set values from the memory 2 and writes schedule patterns through the system bus. Furthermore, schedule patterns can be also rewritten through the system bus.

The schedule register selection unit 102 selects one of the thread schedule registers SKR1 and SKR2 of the thread control resister unit 101 according to a control signal from the interrupt control unit 120, and connects the selected thread schedule register with the selector 103. Therefore, the schedule register selection unit 102 outputs a schedule pattern set in the selected one of the thread schedule registers SKR1 and SKR2 to the selector 103.

The counter 111 updates the count value CNT at predefined intervals. More specifically, the counter 111 counts up the count value CNT in synchronization with the operation clock (not shown) of the multi-thread processor 1. Further, the count value CNT of the counter 111 is reset by a reset signal from the system bus.

The counter upper-limit register 112 retains a count maximum value CNTM that defines the upper-limit value of the count value CNT of the counter 111. Any given value from 0 to k (k is an integer no less than 0 and no more than n−1) may be set in this count maximum value CNTM. Further, the count maximum value CNTM can be set through the system bus.

The match comparison circuit 113 compares the count value CNT with the count maximum value CNTM, and when the count value CNT matches with the count maximum value CNTM, outputs a reset signal RST that resets the count value of the counter 111. That is, the counter 111 repeats the counting-up action while initializing the count value CNT at predefined intervals, and thereby outputs the count value CNT whose value is cyclically updated.

The selector 103 selects one of the slots of the thread schedule register selected by the schedule register selection unit 102 according to the count value CNT. Then, it outputs a thread number retained in that selected slot as a thread selection signal TSEL. The thread number indicated by this thread selection signal TSEL represents the assigned number of a hardware thread that is executed in the next execution cycle.

Details of the thread selection signal TSEL output by this selector 103 is explained hereinafter. Note that the following explanation is made on the assumption that the schedule register selection unit 102 selects the thread schedule register SKR1. FIG. 5 is a table showing relation between the thread selection signal TSEL output from the selector 103 and the count value CNT of the counter 111. It is alto assumed in the following explanation that the initial value of the count value CNT of the counter 111 is "0" and the value CNTM of the count upper-limit value register is "4".

As shown in FIG. 5, the count value CNT of the counter 111 is "0" at a time t1. Therefore, the selector 103 outputs the hardware thread number "0" retained in the slot SLT1 as a thread selection signal TSEL. Next, the count value CNT of the counter 111 is "1" at a time t2. Therefore, the selector 103 outputs the hardware thread number "1" retained in the slot SLT2 as a thread selection signal TSEL. At a time t3, the count value CNT of the counter 111 is "2". Therefore, the selector 103 outputs the hardware thread number "0" retained in the slot SLT3 as a thread selection signal TSEL. At a time t4, the count value CNT of the counter 111 is "3". Therefore, the selector 103 outputs the hardware thread number "2" retained in the slot SLT4 as a thread selection signal TSEL. At a time t5, the count value CNT of the counter 111 is "4". Therefore, the selector 103 outputs the hardware thread number "1" retained in the slot SLT5 as a thread selection signal TSEL.

In this manner, the count value CNT is incremented one by one from the time t1 to t5. Further, at each time, one of the slots is selected according to the count value, and a hardware thread number retained in the selected slot is output as a thread selection signal TSEL. However, since the count value CNT reaches "4" at the time t5, the count value CNT of the counter 111 is reset to "0". Therefore, the count value CNT of the counter 111 becomes "0" at a time t6. Therefore, at the time t6, the selector 103 performs a similar action to that of the time t1 again. Accordingly, the selector 103 repeats, at the time t6 and later, similar actions to those performed in the time t1 to t5.

Figure 6:
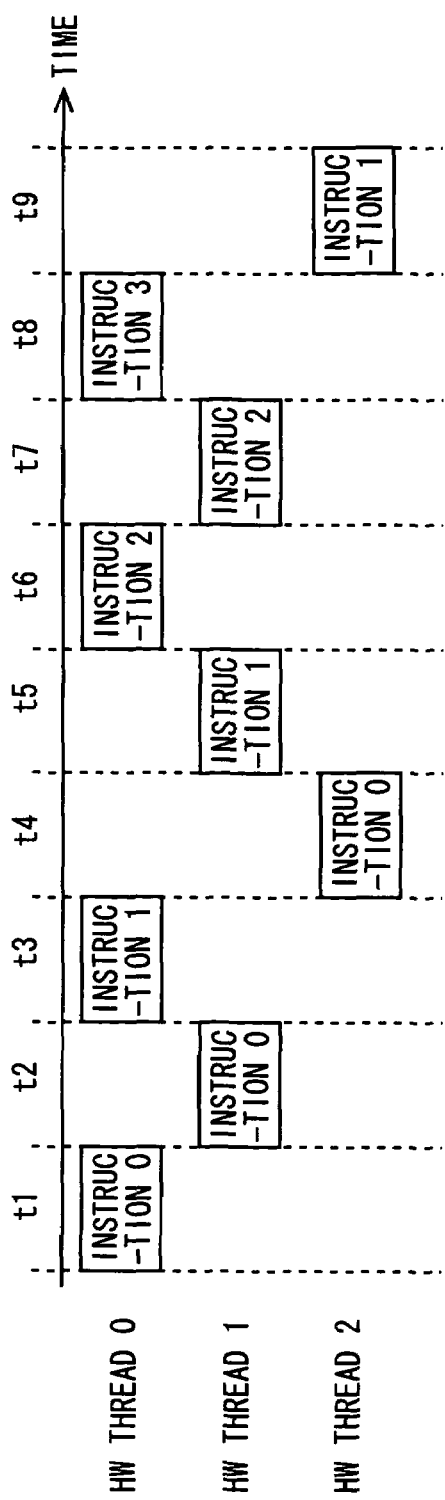
FIG. 6 is a timing chart showing operations of a multi-thread processor in accordance with a first exemplary embodiment of the present invention.

FIG. 6 shows a timing chart for explaining the above-described operations. Note that the time shown in FIGS. 5 and 6 indicates the identical time. Firstly, as described above, the hardware thread number "0" is output from the selector 103 as a thread selection signal TSEL at the time t1. Therefore, as shown in FIG. 6, the selector 18 outputs an instruction corresponding to the hardware thread "0" ("instruction 0" in FIG. 6) to the execution pipeline 10 according to this thread selection signal TSEL. Next, the hardware thread number "1" is output from the selector 103 as a thread selection signal TSEL at the time t2. Therefore, the selector 18 outputs "instruction 0" corresponding to the hardware thread "1" to the execution pipeline 10 according to this thread selection signal TSEL.

Further, the hardware thread number "1" is output from the selector 103 as a thread selection signal TSEL at the time t3. Therefore, the selector 18 outputs "instruction 1" corresponding to the hardware thread "0" to the execution pipeline 10 according to this thread selection signal TSEL. At the time t4, the hardware thread number "2" is output from the selector 103 as a thread selection signal TSEL. Therefore, the selector 18 outputs "instruction 0" corresponding to the hardware thread "2" to the execution pipeline 10 according to this thread selection signal TSEL. At the time t5, the hardware thread number "1" is output from the selector 103 as a thread selection signal TSEL. Therefore, the selector 18 outputs "instruction 0" corresponding to the hardware thread "1" to the execution pipeline 10 according to this thread selection signal TSEL.

In this manner, the selector 18 outputs instructions corresponding to the hardware thread numbers to the execution pipeline 10 according to the thread selection signal TSEL from the selector 103 in the time t1 to t5. Further, at the time t6 and later, similar actions to those performed in the time t1 to t5 are repeated. Assuming a period from the time t1 to time t5 as one cycle, the ratio for each hardware thread that is executed by the multi-thread processor 1 according to this schedule becomes 40%, 40%, and 20% for the hardware thread "0", hardware thread "1", and hardware thread "2" respectively in one cycle.

Note that examples of programs that are executed in the hardware thread "0" by the multi-thread processor 1 include one corresponding to communication data processing in an in-vehicle LAN. Further, examples of programs that are executed in the hardware thread "1" by the multi-thread processor 1 include one corresponding to encoding processing of video data. Furthermore, examples of programs that are executed in the hardware thread "2" by the multi-thread processor 1 include one corresponding to timer processing.

The interrupt control unit 120 includes an interrupt handler 121 and a schedule selection circuit 122. When the interrupt handler 121 receives an interrupt instruction signal from the interrupt controller 11, the interrupt handler 121 determines that the operating mode of the multi-thread processor 1 should be changed from the normal operation to the interrupt processing operation according to that interrupt instruction signal.

The schedule selection circuit 122 outputs a control signal that causes the schedule register selection unit 102 to select one of the thread schedule registers SKR1 and SKR2 based on the determination result of the interrupt handler 121.

Figure 7:
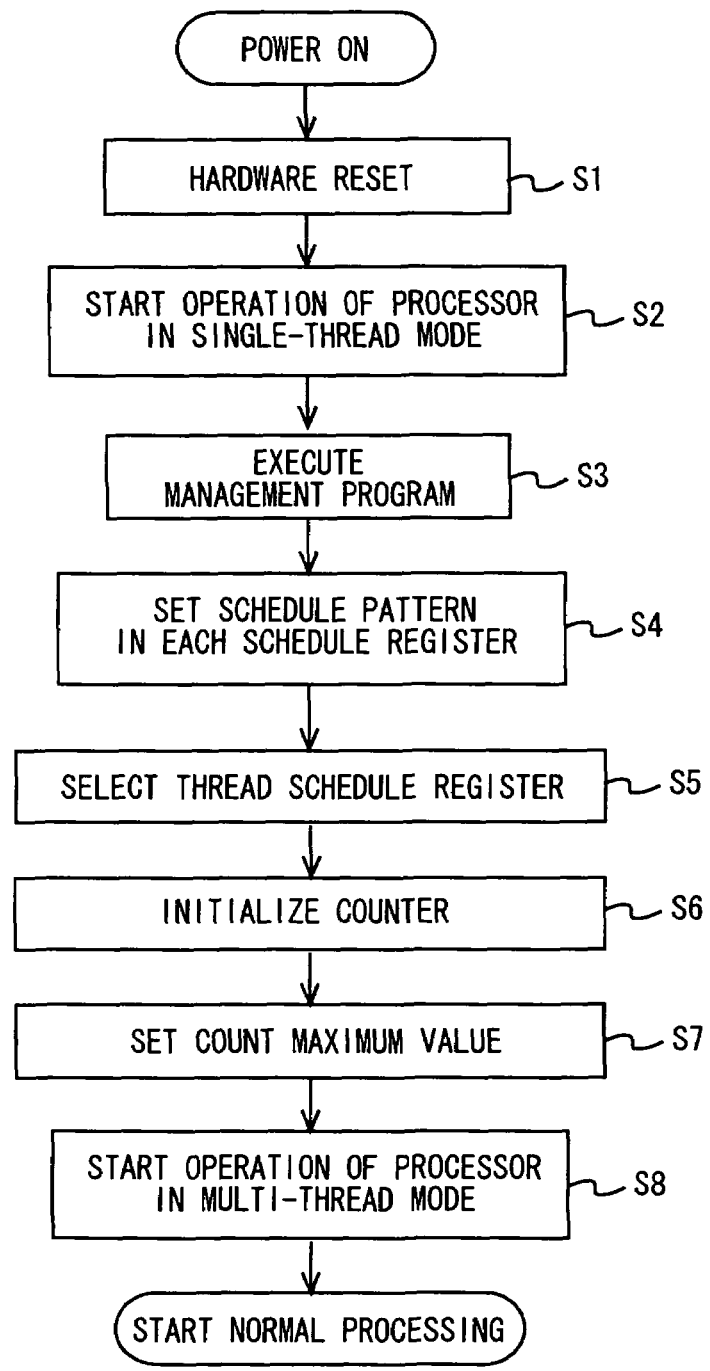
FIG. 7 is a flowchart showing operation procedure that is performed when a multi-thread processor in accordance with a first exemplary embodiment of the present invention is stated up.

Next, operations of the multi-thread processor 1 using the thread scheduler 19 are explained hereinafter. FIG. 7 shows a flowchart showing operation procedure from when the multi-thread processor 1 is powered on to when the normal processing is started. As shown in FIG. 7, after the power-on, the multi-thread processor 1 first initializes its circuit state by the hardware reset (step S1). Then, the multi-thread processor 1 starts operating in a single-thread (step S2). In this single-thread mode, the thread program counter TPC0, the instruction memory 14, and the instruction buffer area BUF0, for example, are activated, and other thread program counters TPC1 to TPC3 and instruction buffer areas BUF1 to BUF3 wait ready in the standby state.

Then, the multi-thread processor 1 read a management program from the memory 2 or other storage devices (not shown) and executes the management program (step S3). After that, the multi-thread processor 1 sets schedule patterns in the thread schedule registers SKR1 and SKR2 of the thread control resister unit 101 in accordance with the management program (step S4). Further, the schedule register selection unit 102 selects the thread schedule register SKR1 in which a schedule pattern for a normal operation is retained according to a control signal from the interrupt control unit 120 (step S5).

The initialization of the count value CNT of the counter 111 (step S6) and the setting of the count maximum value CNTM of the counter upper-limit value register 112 (step S7) are performed. After the setting of these various registers is completed, the multi-thread processor 1 starts operating in a multi-thread mode (step S8). In this multi-thread mode, the thread program counter TPC0 to TCP3, the instruction memory 14, and the instruction buffer area BUF0 to BUF3, for example, are activated. Then, the multi-thread processor 1 starts the normal operation in the multi-thread mode.

Figure 8:
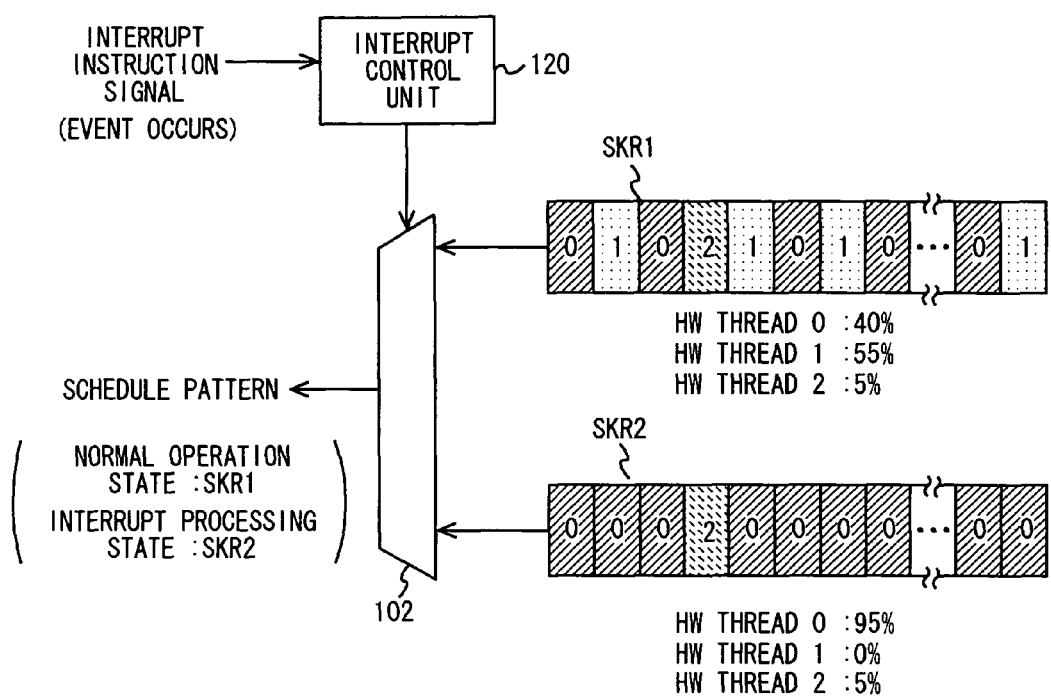
FIG. 8 is a schematic diagram for explaining operations of a thread scheduler in accordance with a first exemplary embodiment of the present invention.

Next, operations of the multi-thread processor 1 after the normal operation has started are explained hereinafter. In the following explanation, operations of the thread scheduler 19, in particular, are explained. FIG. 8 shows a schematic diagram for explaining selection operations of the thread schedule registers SKR1 and SKR2 by the schedule register selection unit 102.

Firstly, as shown in FIG. 8, the schedule register selection unit 102 selects a schedule pattern retained in one of the thread schedule registers SKR1 and SKR2 based on a control signal from the interrupt control unit 120, and outputs the selected schedule pattern to the selector 103. Note that the schedule register selection unit 102 outputs a schedule pattern retained in the thread schedule register SKR1 in the normal operation state. Further, when an interrupt instruction signal is input to the interrupt control unit 120, the interrupt control unit 120 outputs a control signal. The schedule register selection unit 102 switches the schedule pattern from the schedule pattern of the thread schedule register SKR1 to the schedule pattern of the thread schedule register SKR2 according to this control signal, and outputs the schedule pattern of the thread schedule register SKR2.

Figure 9:
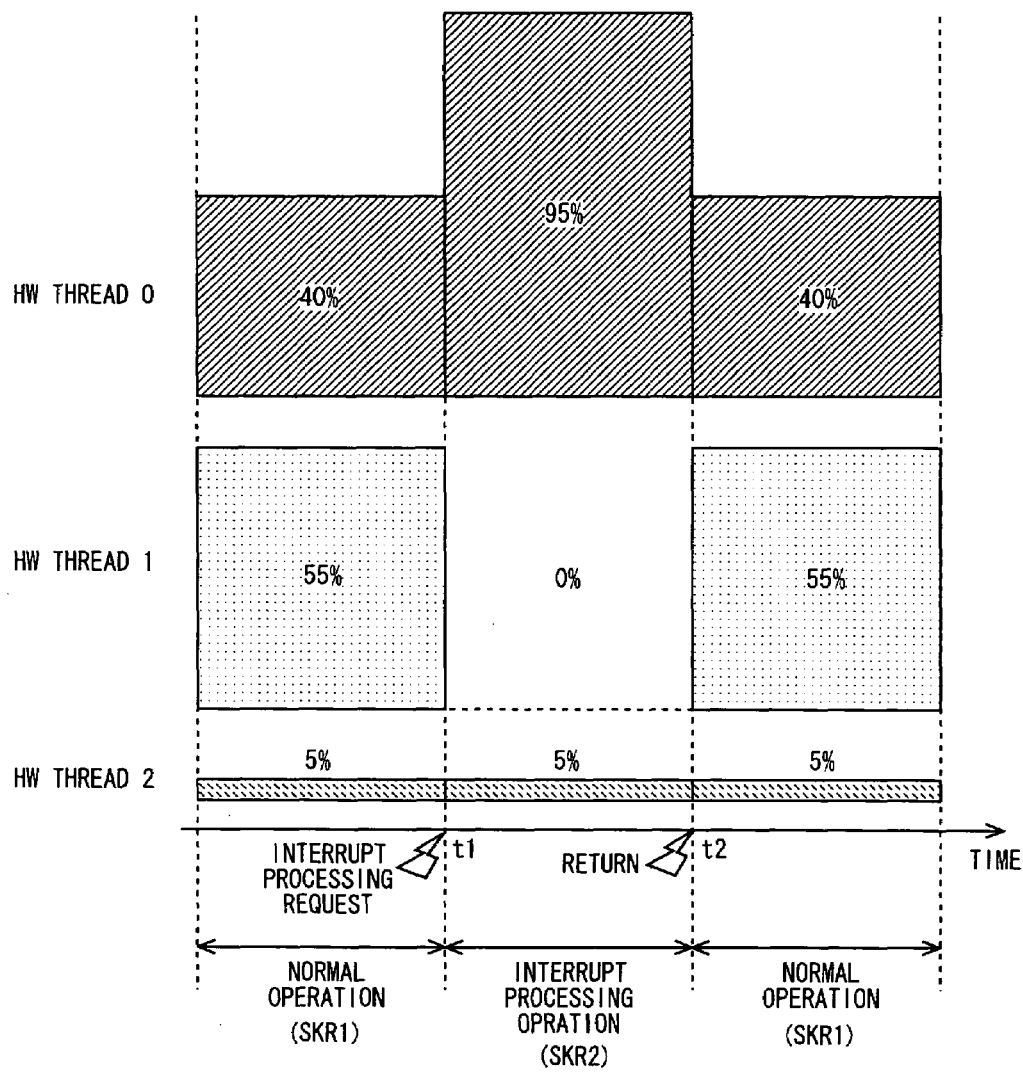
FIG. 9 is a timing chart showing operations of a multi-thread processor in accordance with a first exemplary embodiment of the present invention.

FIG. 9 is a timing chart for explaining the change in the ratio for each hardware thread that is executed by the multi-thread processor 1 based on the selection operation of this schedule register selection unit 102. Note that the initial value of the count value CNT of the counter 111 is assumed to be "0" and the value CNTM of the count upper-limit value register is assumed to be "n−1". That is, it is assumed that a schedule pattern of the thread schedule register SKR1 or SKR2 is entirely executed by the multi-thread processor 1.

As shown in FIG. 9, the multi-thread processor 1 performs the normal operation and the schedule register selection unit 102 outputs the schedule pattern of the thread schedule register SKR1 (schedule SKR1) before the time t1. Therefore, the ratio for each hardware thread executed by the multi-thread processor 1 is 40%, 55%, and 5% for the hardware thread "0", hardware thread "1", and hardware thread "2" respectively.

Note that it is also assumed that, as an example, the hardware thread "0", hardware thread "1", and hardware thread "2" are associated with communication data processing in an in-vehicle LAN, decoding processing of image data, and timer processing respectively.

For example, when there is an external request for in-vehicle LAN communication at a time t1, an interrupt processing request occurs for the multi-thread processor 1 in order to process the communication data. Therefore, the interrupt control unit 120 receives an interrupt instruction signal from the interrupt controller 11. Therefore, the schedule register selection unit 102 selects the thread schedule register SKR2 based on the control signal from the interrupt control unit 120, and outputs a schedule pattern of the thread schedule register SKR2. Accordingly, the ratio for each hardware thread executed by the multi-thread processor 1 becomes 95%, 0%, and 5% for the hardware thread "0", hardware thread "1", and hardware thread "2" respectively.

The interrupt processing operation is completed at a time t2, and the multi-thread processor 1 returns to the normal operation. Therefore, the schedule register selection unit 102 selects the thread schedule register SKR1 again based on the control signal from the interrupt control unit 120, and outputs a schedule pattern of the thread schedule register SKR1. Accordingly, the ratios for the respective hardware threads executed by the multi-thread processor 1 become similar values to those allocated before the time t1.

As described above, in the multi-thread processor 1 in accordance with this first exemplary embodiment of the present invention, the thread control resister unit 101 includes the thread schedule registers SKR1 and SKR2. Hardware thread ratios suitable for the respective operating modes of the multi-thread processor 1 (normal operation and interrupt processing operation) are set in schedule patterns possessed by these thread schedule registers SKR1 and SKR2. Further, when an interrupt processing request occurs, it is possible to automatically perform switching between these schedule patterns of the thread schedule registers SKR1 and SKR2 by the interrupt control unit 120. Therefore, the multi-thread processor 1 in accordance with this first exemplary embodiment of the present invention can provide an optimal schedule pattern according to the operating mode of the processor, and thus enabling automatic and swift switching of the schedule pattern in response to an interrupt request, which has been very difficult in the related art.

Further, as shown by the hardware thread "2" in FIG. 9, it is also possible to secure a fixed ratio for a hardware thread to be executed by the multi-thread processor 1 regardless of whether the operating mode is the normal operation or the interrupt processing operation. This can be realized by storing the hardware thread number "2" with a fixed ratio in slots of each thread schedule register. In this way, the multi-thread processor 1 can carry out a timer operation used by the system, a system monitoring process for continuously monitoring the system, and a similar process regardless of the operating mode of the processor. Therefore, in accordance with this first exemplary embodiment of the present invention, it is possible to reliably ensure the execution of the processing operation that has to be performed without fail in order to maintain the proper operation of system and the like even in a multi-thread processor.

[Second Exemplary Embodiment]

A specific second exemplary embodiment to which the present invention is applied is explained hereinafter in detail with reference to the drawings. The configuration of a second exemplary embodiment of the present invention is different from that of the first exemplary embodiment in that the thread schedule register SKR2 of the thread control resister unit 101 is changed to a thread schedule register SKR3. Note that the change to the thread schedule register SKR3 is not a physical change of the register, and it may include a case where the schedule pattern retained in the register is rewritten from SKR2 to SKR3. Other configurations are same as those of the first exemplary embodiment, and therefore their explanation is omitted.

The thread schedule register SKR3 has a hardware thread number that enables the multi-thread processor 1 to perform specific fixedly-scheduled operations. In this example, the thread schedule register SKR3 has only the hardware thread number "3". For example, as shown in a schematic diagram of FIG. 10, the thread schedule register SKR3 may include only one slot, and the hardware thread number "3" may be retained in that slot. Note that in this case, the counter 111 may be configured to constantly output the count value CNT "0", or the selector 103 may be configured to constantly output a value retained in the slot 1 regardless of the count value CNT. Alternatively, the thread schedule register SKR3 may include n slots and the hardware thread number "3" may be stored in all the slots.

Figure 10:
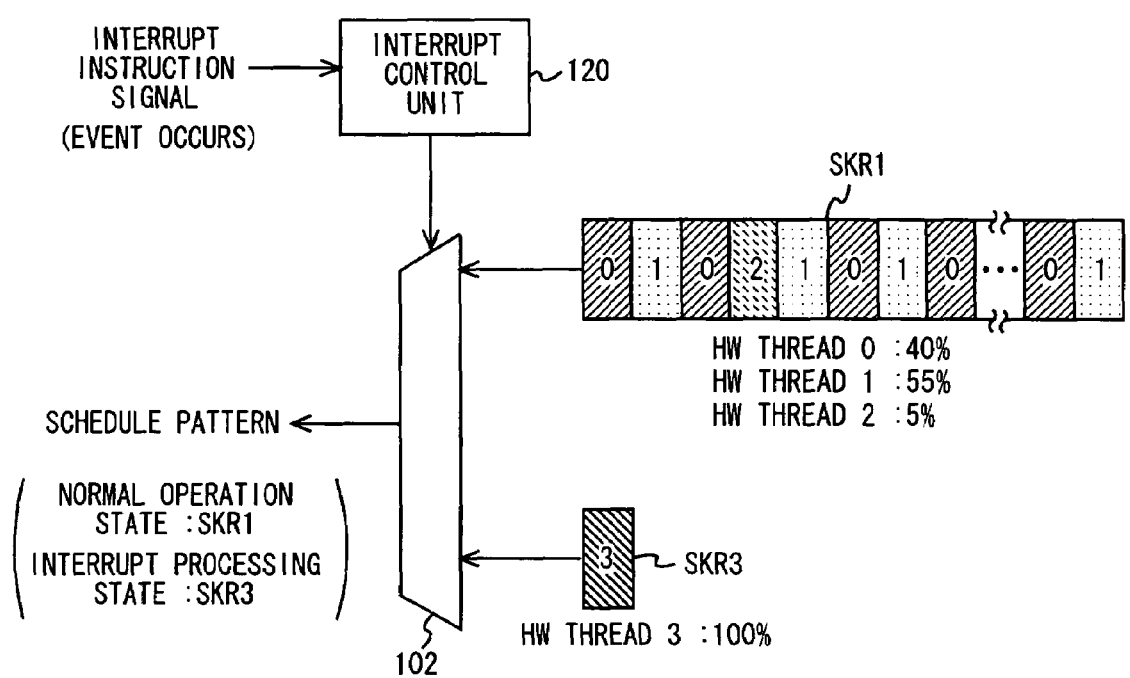
FIG. 10 is a schematic diagram for explaining operations of a thread scheduler in accordance with a second exemplary embodiment of the present invention.

FIG. 10 shows a schematic diagram for explaining the selection operation of the thread schedule registers SKR1 and SKR3 by the schedule register selection unit 102 in accordance with this second exemplary embodiment of the present invention. As shown in FIG. 10, the schedule register selection unit 102 selects a schedule pattern retained in one of the thread schedule registers SKR1 and SKR2 based on a control signal from the interrupt control unit 120, and outputs the selected schedule pattern to the selector 103. Note that the schedule register selection unit 102 outputs a schedule pattern of the thread schedule register SKR1 in the normal operation state. Further, when an interrupt instruction signal is input to the interrupt control unit 120, the schedule register selection unit 102 outputs a schedule pattern of the thread schedule register SKR3 based on a control signal from the interrupt control unit 120.

Figure 11:
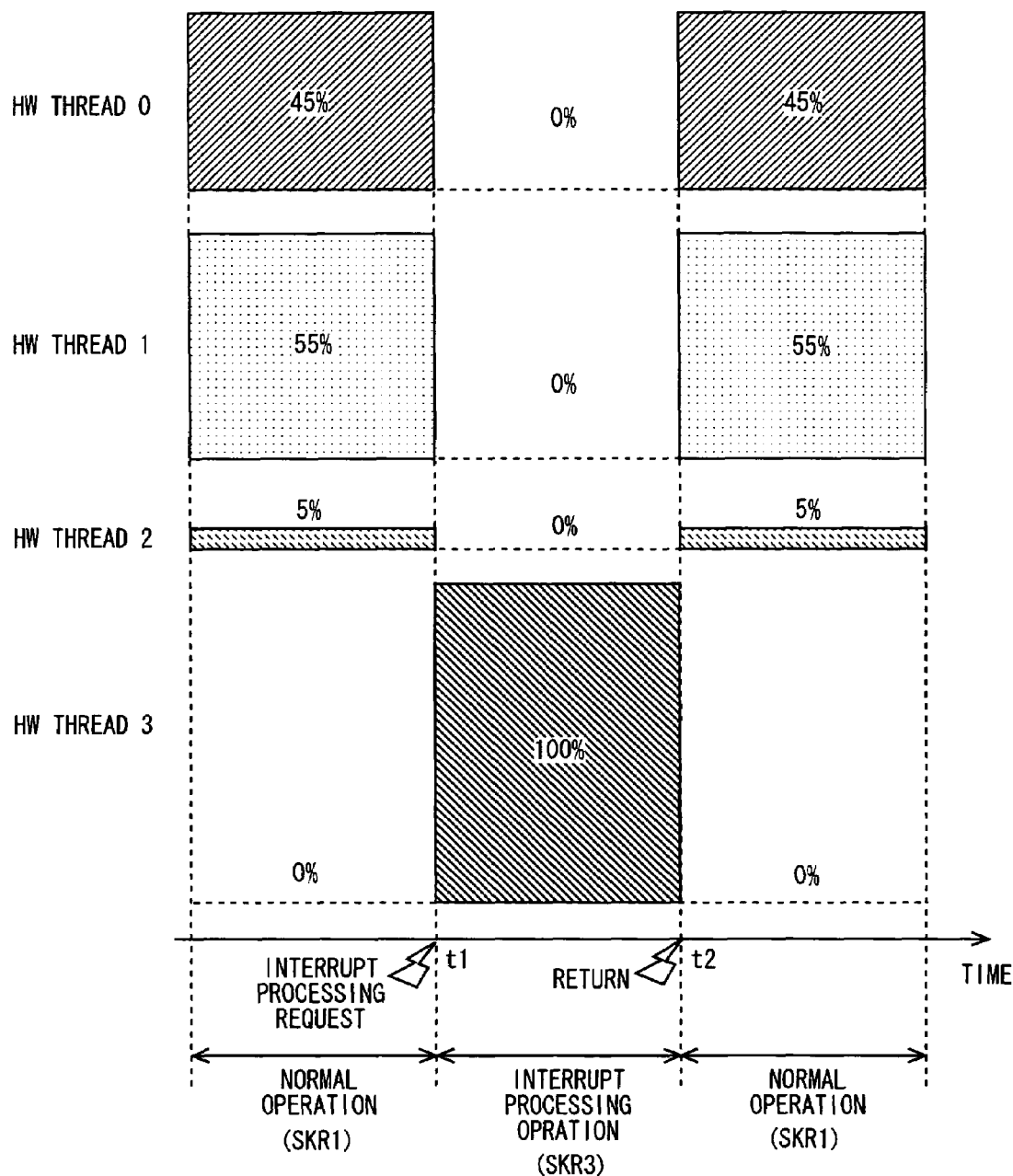
FIG. 11 is a timing chart showing operations of a multi-thread processor in accordance with a second exemplary embodiment of the present invention.

FIG. 11 is a timing chart for explaining the change in the ratio for each hardware thread that is executed by the multi-thread processor 1 based on the selection operation of the schedule register selection unit 102. Note that the initial value of the count value CNT of the counter 111 is assumed to be "0" and the value CNTM of the count upper-limit value register is assumed to be "n−1". That is, it is assumed that the schedule pattern of the thread schedule register SKR1 is entirely executed by the multi-thread processor 1.

As shown in FIG. 11, the multi-thread processor 1 performs the normal operation and the schedule register selection unit 102 outputs the schedule pattern of the thread schedule register SKR1 before the time t1 as in the case of the first exemplary embodiment. Therefore, the ratio for each hardware thread executed by the multi-thread processor 1 is 40%, 55%, 5%, and 0% for the hardware thread "0", hardware thread "1", hardware thread "2", and hardware thread "3" respectively.

For example, when there is an external request for in-vehicle LAN communication at a time t1, an interrupt processing request occurs for the multi-thread processor 1 in order to process the communication data. Furthermore, in this example, it is assumed that communication data increases significantly and therefore it becomes necessary to give a high priority only to the processing of the communication data in order to avoid the occurrence of system errors. In this case, an interrupt processing request occurs for the multi-thread processor 1. Therefore, the interrupt control unit 120 receives an interrupt instruction signal from the interrupt controller 11. Therefore, the schedule register selection unit 102 selects the thread schedule register SKR3 based on the control signal from the interrupt control unit 120, and outputs a schedule pattern of the thread schedule register SKR3. Accordingly, the ratio for each hardware thread executed by the multi-thread processor 1 becomes 0%, 0%, 0%, and 100% for the hardware thread "0", hardware thread "1", hardware thread "2", and hardware thread "2" respectively.

The interrupt processing operation is completed at a time t2, and the multi-thread processor 1 returns to the normal operation. Therefore, the schedule register selection unit 102 selects the thread schedule register SKR1 again based on the control signal from the interrupt control unit 120, and outputs a schedule pattern retained in the thread schedule register SKR1. Accordingly, the ratios for the respective hardware threads executed by the multi-thread processor 1 become similar values to those allocated before the time t1.

As described above, in the second exemplary embodiment of the present invention, the schedule pattern of the thread schedule register SKR3 of the thread control resister unit 101 is defined to be a hardware thread number of a fixed value ("3" in this example). In this way, the processing operation to be executed by the multi-thread processor 1 is restricted to a specific hardware thread, and thus making it possible to utilize all the hardware resources of the multi-thread processor 1 such as the execution pipeline for this hardware thread alone. Therefore, for example, when an urgent interrupt processing is required to avoid the occurrence of system errors or the like, this processing can be carried out in an automatic and prompt manner. Further, this urgent interrupt processing can be completed in a short time.

Further, instead of storing the hardware thread number "3" in a storage device such as a register, the information about the hardware thread number "3" written in a ROM or the like in advance may be used. In this case, the execution pipeline 10 performs the switching by selecting one of the signal lines from the thread control resister unit 101 and the ROM. In such a case, the hardware thread number "3" output from the ROM may be directly used as the thread selection signal TSEL, instead of using the thread selection signal TSEL output through the selector 103. In this way, the hardware resources can be used more efficiently.

[Third Exemplary Embodiment]

Figure 12:
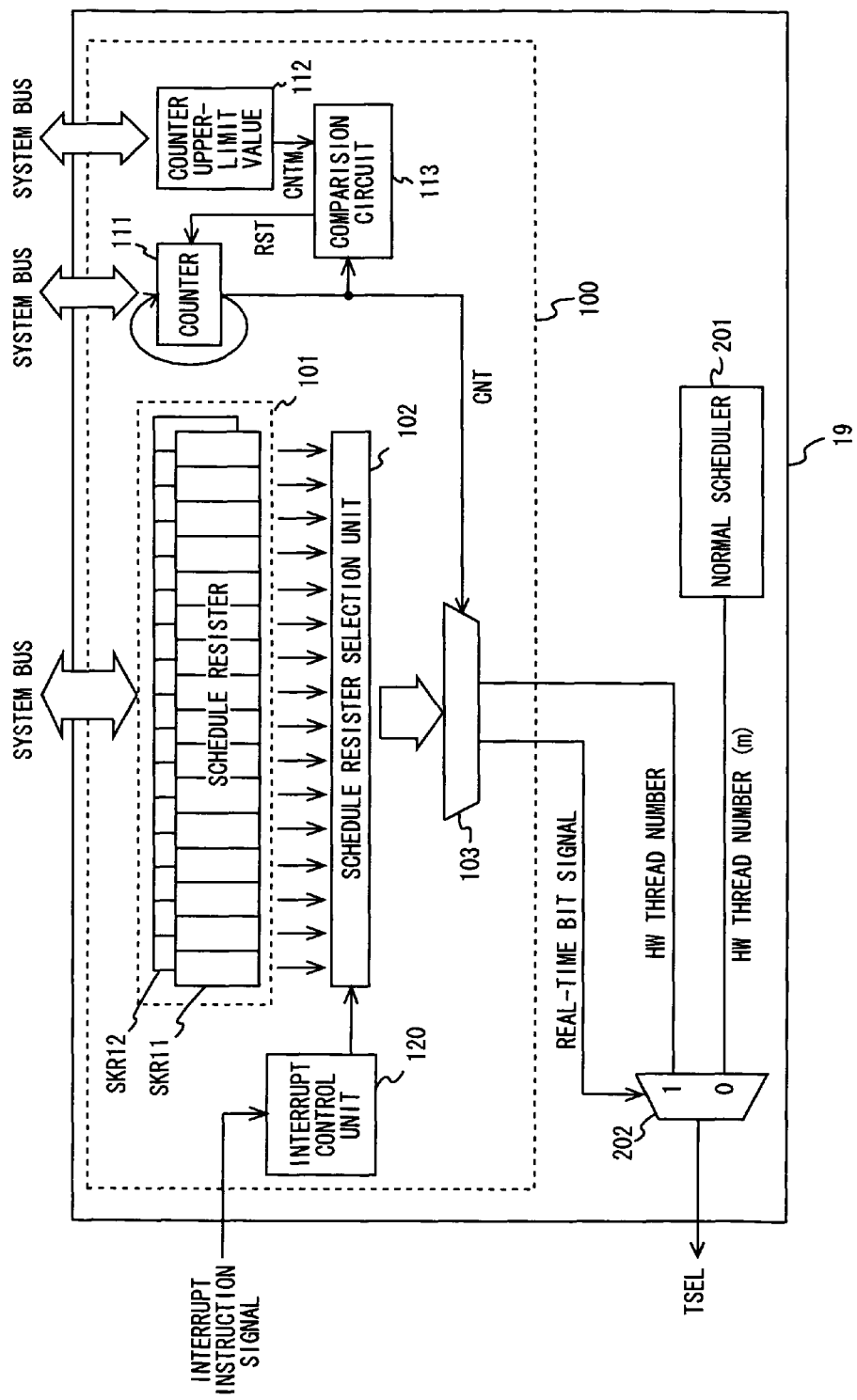
FIG. 12 is a block diagram of a thread scheduler in accordance with a third exemplary embodiment of the present invention.

A specific third exemplary embodiment to which the present invention is applied is explained hereinafter in detail with reference to the drawings. FIG. 12 is a block diagram of a thread scheduler 19 in accordance with a third exemplary embodiment of the present invention. The third exemplary embodiment of the present invention is different from the first exemplary embodiment in that it has a normal scheduler 201 and the like as an additional scheduler. Further, each of the slots possessed by the thread schedule registers in the thread control resister unit 101 retains a flag that is used to generate a real-time bit signal in addition to the hardware thread number. Other configurations are same as those of the first exemplary embodiment. Therefore, the following explanation for this third exemplary embodiment of the present invention is made with a particular emphasis on the parts that are different from the first exemplary embodiment.

As shown in FIG. 12, a thread scheduler 19 in accordance with this third exemplary embodiment of the present invention includes a scheduler unit 100, a normal scheduler 201 (second scheduler), and a selector 202. The scheduler unit 100 corresponds to the thread scheduler 19 of the first exemplary embodiment. Accordingly, its configurations and operations are substantially the same as those of the first exemplary embodiment, and explanation for any part other than those different from the first exemplary embodiment is omitted.

Figure 13:
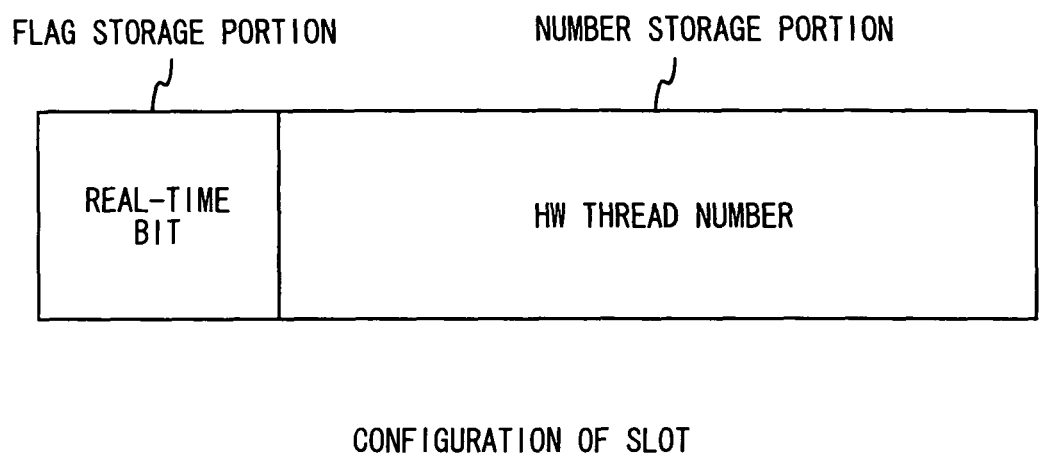
FIG. 13 is a schematic diagram illustrating a configuration of a slot in accordance with a third exemplary embodiment of the present invention.

The thread control resister unit 101 of this third exemplary embodiment of the present invention includes thread schedule registers SKR11 and SKR12. Each of the thread schedule registers SKR11 and SKR12 includes a plurality of slots. FIG. 13 shows a configuration of this slot. As shown in FIG. 13, each slot includes a number storage portion in which a hardware thread number is retained, and a flag storage portion in which a real-time bit flag is retained. The real-time bit flag is a flag that is used to determine the logic level of a real-time bit signal when that particular slot is selected. As described above, each slot of this third exemplary embodiment of the present invention has not only information about a hardware thread number but also flag information used to determine the logic level of a real-time bit signal.

Figure 14:
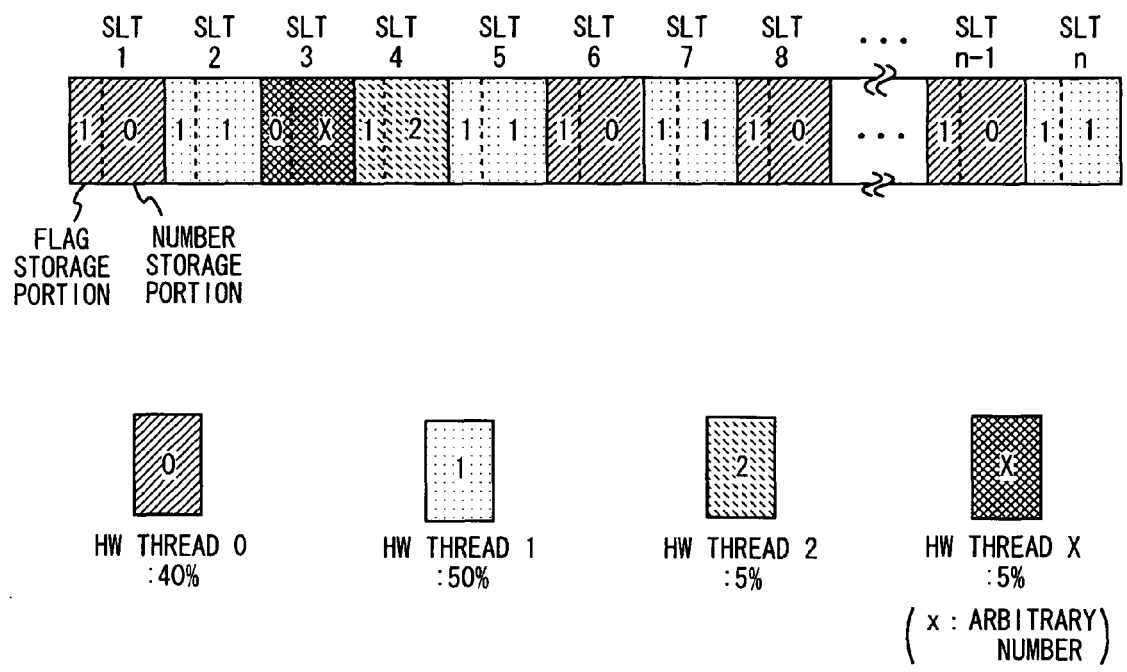
FIG. 14 is a schematic diagram illustrating a configuration of a schedule in accordance with a third exemplary embodiment of the present invention.
Figure 15:
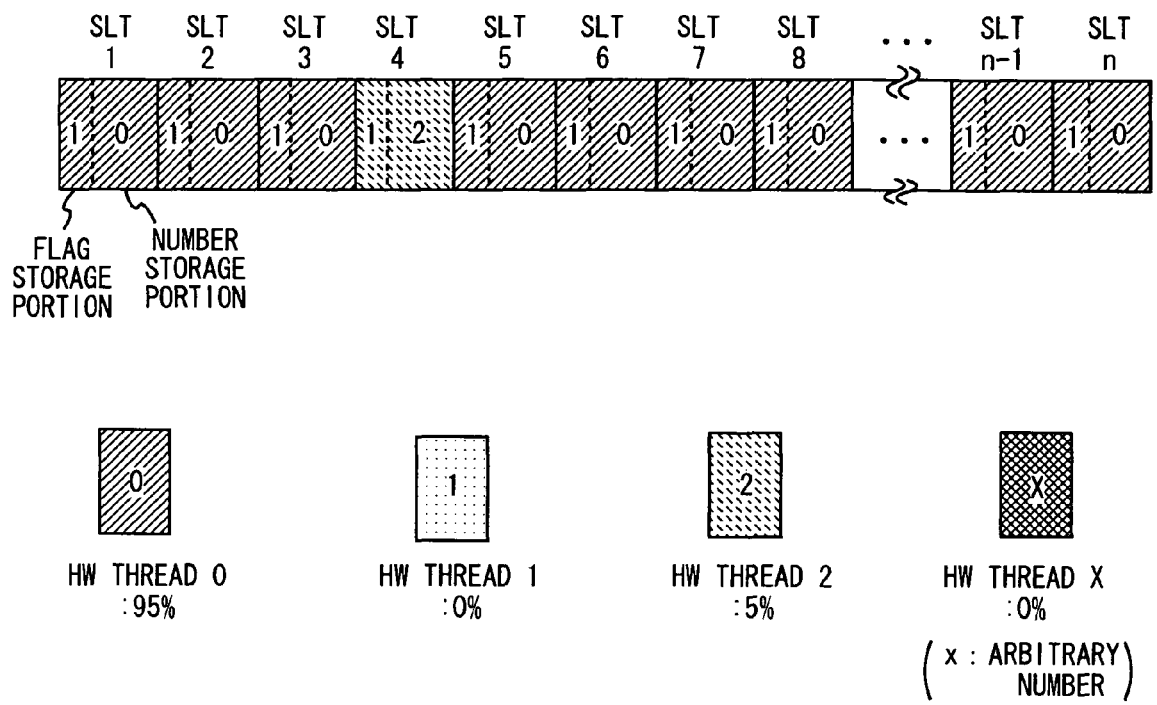
FIG. 15 is a schematic diagram illustrating a configuration of a schedule in accordance with a third exemplary embodiment of the present invention.

The thread schedule registers SKR11 and SKR12 retains the respective schedule patterns as shown in FIGS. 14 and 15. FIGS. 14 and 15 show schematic diagrams of schedule patterns that are stored in the thread schedule registers SKR11 and SKR12 respectively.

As shown in FIG. 14, the schedule SKR11 includes n slots indicated by signs SLT1 to SLTn. In this example, the slot SLT1 retains a hardware thread number "0" and a real-time bit flag "1"; the slot SLT2 retains a hardware thread number "1" and a real-time bit flag "1"; the slot SLT3 retains an arbitrary hardware thread number and a real-time bit flag "0"; the slot SLT4 retains a hardware thread number "2" and a real-time bit flag "1"; . . . . It is assumed, for example, that the occupation ratio for the real-time bit flag "1" and the hardware thread number "0" in this schedule SKR11 is 40%; the occupation ratio for the real-time bit flag "1" and the hardware thread number "1" is 50%; the occupation ratio for the real-time bit flag "1" and the hardware thread number "2" is 5%; and the occupation ratio for the real-time bit flag "0" (hardware thread number is arbitrary) is 5%.

Further, as shown in FIG. 15, the schedule SKR12 includes n slots indicated by signs SLT1 to SLTn. In this example, it is also assumed that all the real-time flags of the slots SLT1 to SLTn have a value "1". Further, in the schedule SKR12, the slot SLT4 retains a hardware thread number "2", and all the other slots retains a hardware thread number "0". It is also assumed, for example, that the occupation ratio for the hardware thread number "0" in this schedule SKR12 is 95%; the occupation ratio for the hardware thread number "1" is 0%; the occupation ratio for the hardware thread number "2" is 5% as with the schedule SKR1; and the occupation ratio for the real-time bit flag "0" (hardware thread number is arbitrary) is 0%.

It is also assumed that a schedule pattern set in the thread schedule register SKR11 is a schedule pattern that is used when the multi-thread processor 1 performs the normal operation. Further, a schedule pattern set in the thread schedule register SKR12 is a schedule pattern that is used when the multi-thread processor 1 performs an interrupt operation. Note that schedule patterns set in the thread schedule registers SKR11 and SKR12 are written through the system bus when the multi-thread processor 1 is started up. Furthermore, they can be also rewritten through the system bus.

The selector 103 outputs a real-time bit signal based on a value of the flag storage portion of the selected slot, in addition to carrying out the functions of the first exemplary embodiment. More specifically, when the value of the number storage portion of the selected slot is "0" and the value of the flag storage portion is "1", the selector 103 outputs a hardware thread number "0" and a real-time bit signal "1". Further, when the value of the flag storage portion of the selected slot is "0", it outputs a real-time bit signal "0". Note that when the value of the flag storage portion is "0", it may or may not output an arbitrary value of the number storage portion of the slot.

The normal scheduler 201 selects an arbitrary hardware thread, for example, in accordance with the procedure of a round-robin method or a priority method, and therefore outputs a hardware thread number "m" according to that procedure. However, note that this number "m" is assumed to be a number that is assigned to a hardware thread possessed by the multi-thread processor 1. More specifically, if the multi-thread processor 1 has hardware threads "0" to "3", the number "m" is an arbitrary number selected from "0" to "3".

When the real-time bit signal is "1", the selector 202 outputs a hardware thread number received from the scheduler unit 100 as a thread selection signal TSEL. Further, when the real-time bit signal is "0", the selector 202 outputs a hardware thread number received from the normal scheduler 201 as a thread selection signal TSEL.

Operations of the multi-thread processor 1 using the thread scheduler 19 in accordance with this third exemplary embodiment of the present invention are explained hereinafter. Firstly, FIG. 16 shows a table showing relation between the thread selection signal TSEL output from the selector 202 and the count value CNT of the counter 111 when the schedule register selection unit 102 selects the thread schedule register SKR11. Note that the initial value of the count value CNT of the counter 111 is assumed to be "0" and the value CNTM of the count upper-limit value register is assumed to be "4" in the following explanation.

As shown in FIG. 16, the count value CNT of the counter 111 is "0" at a time t1. Therefore, the selector 103 outputs a real-time bit signal "1" and a hardware thread number "0" according to a value assigned to the slot SLT1. Since the real-time bit signal is "1", the selector 202 outputs a hardware thread number received from the selector 103 (hardware thread number from the scheduler unit 100) as a thread selection signal TSEL. Next, the count value CNT of the counter 111 is "1" at a time t2. Therefore, the selector 103 outputs a real-time bit signal "1" and a hardware thread number "1" according to a value assigned to the slot SLT2. Since the real-time bit signal is "1", the selector 202 outputs a hardware thread number received from the selector 103 as a thread selection signal TSEL.

At a time t3, the count value CNT of the counter 111 is "2". Therefore, the selector 103 outputs a real-time bit signal "0" and a hardware thread number "x" (x is an arbitrary number) according to a value assigned to the slot SLT3. At this point, since the real-time bit signal is "0", the selector 202 outputs a hardware thread number received from the normal scheduler 201 as a thread selection signal TSEL. As a hardware thread number from the normal scheduler 201 at this point, an arbitrary hardware thread number "m" is output. This arbitrary hardware thread number "m" is a number that is used when the thread scheduler 19 selects an arbitrary hardware thread, for example, in accordance with the procedure of a round-robin method or a priority method as described above.

At a time t4, the count value CNT of the counter 111 is "3". Therefore, the selector 103 outputs a real-time bit signal "1" and a hardware thread number "2" according to a value assigned to the slot SLT4. Since the real-time bit signal is "1", the selector 202 outputs a hardware thread number received from the selector 103 as a thread selection signal TSEL. At a time t5, the count value CNT of the counter 111 is "4". Therefore, the selector 103 outputs a real-time bit signal "1" and a hardware thread number "1" according to a value assigned to the slot SLT5. Since the real-time bit signal is "1", the selector 202 outputs a hardware thread number received from the selector 103 as a thread selection signal TSEL. Since the count value CNT is reset to "0" at a time t6, a similar action to that of the time t1 is carried out again. At the time t6 and later, similar actions to those in the time t1 to t5 are repeated.

In this case, the ratio for each hardware thread executed by the multi-thread processor 1 according to this schedule becomes 20%, 40%, 20%, and 20% for the hardware thread "0", the hardware thread "1", the hardware thread "2", and the arbitrary hardware thread "m" respectively.

Figure 17:
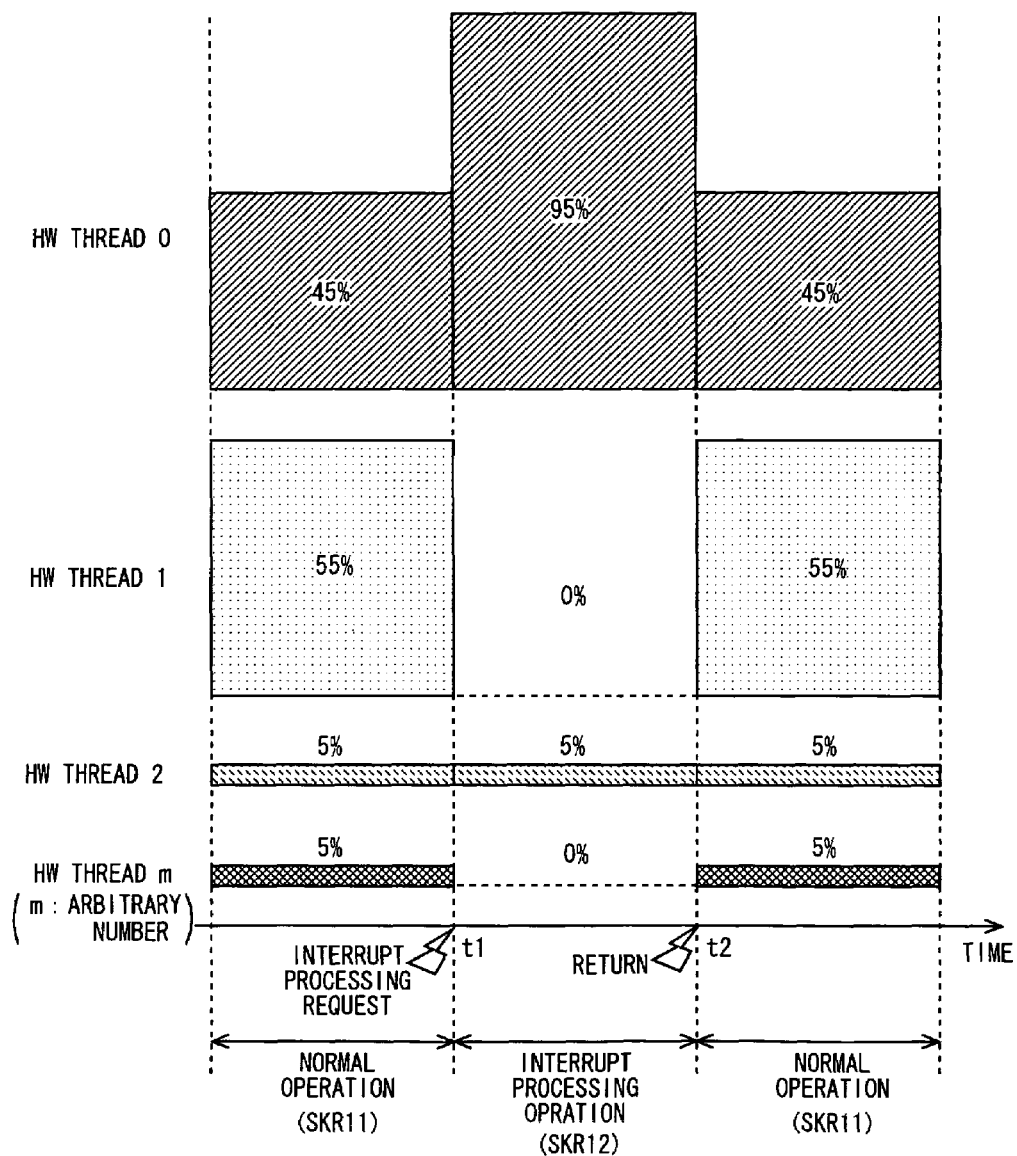
FIG. 17 is a timing chart showing operations of a multi-thread processor in accordance with a third exemplary embodiment of the present invention.

FIG. 17 shows a timing chart for explaining the change in the ratio for each hardware thread that is executed by the multi-thread processor 1 based on the selection operation of this schedule register selection unit 102. Note that the initial value of the count value CNT of the counter 111 is assumed to be "0" and the value CNTM of the count upper-limit value register is assumed to be "n−1". That is, it is assumed that a schedule pattern of the thread schedule register SKR11 or SKR12 is entirely executed by the multi-thread processor 1.

As shown in FIG. 17, the multi-thread processor 1 performs the normal operation and the schedule register selection unit 102 outputs the schedule pattern of the thread schedule register SKR11 (schedule SKR11) before the time t1. Therefore, the ratio for each hardware thread executed by the multi-thread processor 1 is 40%, 50%, 5%, and 5% for the hardware thread "0", the hardware thread "1", the hardware thread 2, and the arbitrary hardware thread "m" respectively.

Note that it is assumed that, as an example, the hardware thread "0", hardware thread "1", and hardware thread "2" are associated with communication data processing in an in-vehicle LAN, decoding processing of image data, and timer processing respectively.

For example, when there is an external request for in-vehicle LAN communication at a time t1, an interrupt processing request occurs for the multi-thread processor 1 in order to process the communication data. Therefore, the interrupt control unit 120 receives an interrupt instruction signal from the interrupt controller 11. Therefore, the schedule register selection unit 102 selects the thread schedule register SKR12 based on the control signal from the interrupt control unit 120, and outputs a schedule pattern retained in the thread schedule register SKR12. Therefore, the ratio for each hardware thread executed by the multi-thread processor 1 is 95%, 0%, 5%, and 0% for the hardware thread "0", the hardware thread "1", the hardware thread 2, and the arbitrary hardware thread "m" respectively.

The interrupt processing operation is completed at a time t2, and the multi-thread processor 1 returns to the normal operation. Therefore, the schedule register selection unit 102 selects the thread schedule register SKR11 again based on the control signal from the interrupt control unit 120, and outputs a schedule pattern retained in the thread schedule register SKR11. Accordingly, the ratios for the respective hardware threads executed by the multi-thread processor 1 become similar values to those allocated before the time t1.

Note that in this example, the ratio of the arbitrary hardware thread "m" selected by the normal scheduler 201 is assumed to be 0% during the interrupt processing operation of the time t1 to t2. The present invention, however, is not limited to this example, and the schedule pattern of the thread schedule register 2 may be established so that the occupation ratio of the arbitrary hardware thread "m" selected by the normal scheduler 201 becomes a predefined ratio during the interrupt processing operation of the time t1 to t2.

As described above, in the multi-thread processor 1 in accordance with this third exemplary embodiment of the present invention, schedule patterns stored in the slots of the thread schedule registers SKR11 and SKR12 have real-time bit flags. Therefore, it is possible to select, based on the value of a real-time bit signal generated according to this real-time bit flag, a hardware thread in a predetermined schedule of the thread schedule registers SKR11 and SKR12 or an arbitrary hardware thread generated by the normal scheduler 201. Therefore, the multi-thread processor 1 in accordance with this third exemplary embodiment of the present invention can execute an arbitrary hardware thread that is not determined in advance, in addition to performing the operations of the first exemplary embodiment. With this feature, the multi-thread processor 1 can increase the processor occupation ratio of an arbitrary hardware thread according to the processing situation. Therefore, more flexible hardware thread selection becomes possible in comparison to the first exemplary embodiment.

[Fourth Exemplary Embodiment]

Figure 18:
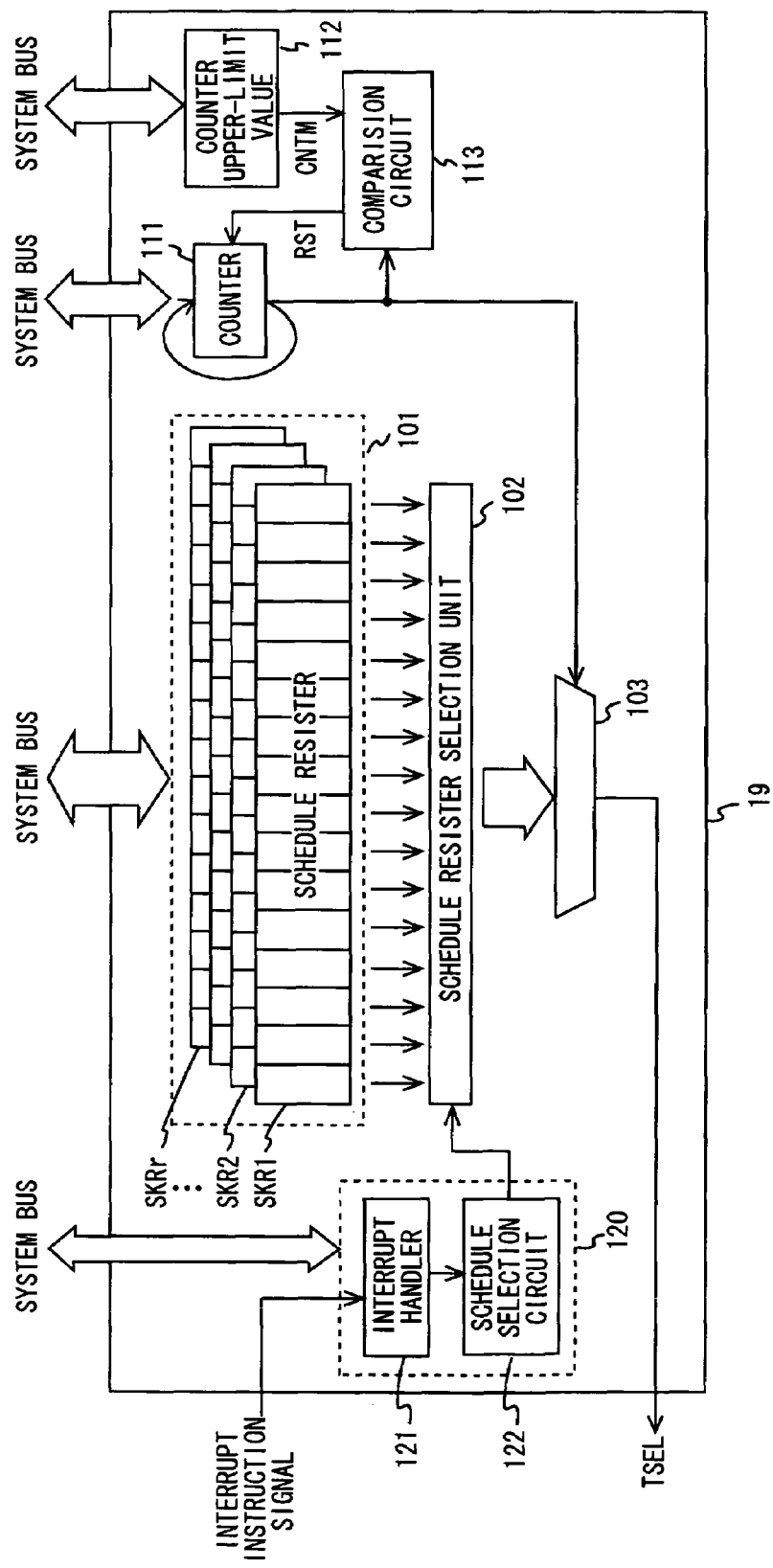
FIG. 18 is a block diagram of a thread scheduler in accordance with a fourth exemplary embodiment of the present invention.

A specific fourth exemplary embodiment to which the present invention is applied is explained hereinafter in detail with reference to the drawings. FIG. 18 is a block diagram of a thread scheduler 19 in accordance with a fourth exemplary embodiment of the present invention. The fourth exemplary embodiment of the present invention is different from the first exemplary embodiment in that the thread control register unit 101 includes more than two thread schedule registers. Further, the interrupt control unit 120 performs control so as to select one of the above-mentioned plurality of thread schedule registers for the schedule register selection unit 102. Other configurations are same as those of the first exemplary embodiment. Therefore, the following explanation for this fourth exemplary embodiment of the present invention is made with a particular emphasis on the parts that are different from the first exemplary embodiment.

As shown in FIG. 18, the thread control resister unit 101 of the scheduler 19 of this fourth exemplary embodiment of the present invention includes thread schedule registers SKR1 to SKRr. Note that "r" is an integer equal to or greater than 3. The thread schedule registers SKR1 to SKRr retain different schedule patterns from each other. Examples of them include the schedules SKR1 and SKR2 of the above-described first exemplary embodiment and the schedule SKR3 of the second exemplary embodiment.

The interrupt handler 121 of the interrupt control unit 120 determines which interrupt processing the multi-thread processor 1 should execute according to an interrupt instruction signal. The schedule selection circuit 122 outputs a control signal used to control the schedule register selection unit 102 according to the determination result of the interrupt handler 121. As a result, the schedule register selection unit 102 can select one of the thread schedule registers SKR1 to SKRr according to the interrupt instruction signal by using this control signal.

Figure 19:
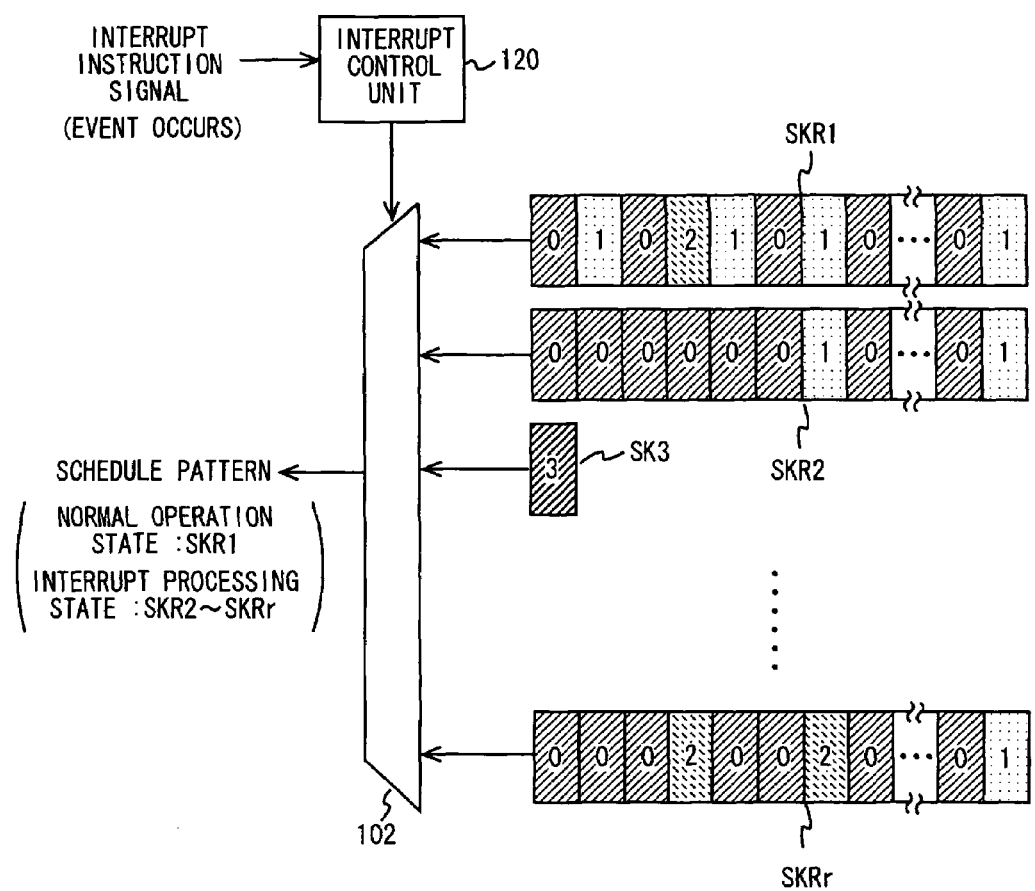
FIG. 19 is a schematic diagram for explaining operations of a thread scheduler in accordance with a fourth exemplary embodiment of the present invention.

FIG. 19 shows a schematic diagram for explaining the selection operation of the thread schedule registers SKR1 to SKRr by the schedule register selection unit 102 in accordance with this fourth exemplary embodiment of the present invention.

As shown in the schematic diagram of FIG. 19, the schedule register selection unit 102 selects one of schedule patterns retained in the thread schedule registers SKR1 to SKRr based on the control signal from the interrupt control unit 120, and outputs the selected schedule pattern to the selector 103. However, the schedule register selection unit 102 outputs a schedule pattern retained in the thread schedule register SKR1 in the normal operation state. Therefore, in this case, when an interrupt instruction signal is input to the interrupt control unit 120, the schedule register selection unit 102 outputs one of schedule patterns retained in the thread schedule registers SKR2 to SKRr based on a control signal from the interrupt control unit 120.

As a more specific operation example of the interrupt control unit 120, the following control may be performed. Firstly, each of the thread schedule registers SKR1 to SKRr is assigned with a pointer corresponding to the respective one of them in advance. Then, the interrupt handler 121 determines an interrupt processing operation according to an interrupt instruction signal, and sends the determination result to the schedule selection circuit 122. The schedule selection circuit 122 designates a pointer according to this determination result, and outputs the pointer information to the schedule register selection unit 102 as a control signal. The schedule register selection unit 102 selects one of the thread schedule registers SKR2 to SKRr corresponding to the pointer information of this control signal, and outputs a schedule pattern of the selected thread schedule register.

Then, after a series of actions of the interrupt processing are finished, the schedule selection circuit 122 designates a pointer corresponding to the thread schedule register SKR1, and outputs the pointer information to the schedule register selection unit 102 as a control signal. As a result, the multi-thread processor 1 returns to the normal operation that was being performed before the interrupt processing operation.

As described above, in this fourth exemplary embodiment of the present invention, the thread control resister unit 101 has at least three thread schedule registers. Further, the interrupt control unit 120 can select an optimal schedule pattern among the plurality of schedule patterns stored in these thread schedule registers according to the type of interrupt processing. In this way, the multi-thread processor 1 in accordance with this fourth exemplary embodiment of the present invention can automatically perform the switching to a schedule pattern suitable for the internal state of the processor when interrupt processing occurs. Further, the multi-thread processor 1 can perform this switching in a very short time.

Furthermore, the use of a pointer like the one explained above has another advantageous effect that even when a schedule pattern of each thread schedule register of the thread control registers unit 101 is rewritten, it can be dealt with just by changing the information of a corresponding pointer, and thus no change or the like on the physical wiring is required.

Note that the present invention is not limited to the above-described exemplary embodiments, and various modifications can be made without departing from the spirit and scope of the present invention. For example, a configuration of the third exemplary embodiment may be combined with the second or fourth exemplary embodiment.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A multi-thread processor comprising:
a plurality of hardware threads each of which generates an independent instruction flow;
a first thread scheduler that outputs a thread selection signal in accordance with a first schedule pattern or a second schedule pattern, the thread selection signal designating a hardware thread to be executed in a next execution cycle from among the plurality of hardware threads;
a first selector that selects one of the plurality of hardware threads according to the thread selection signal and outputs an instruction generated by the selected hardware thread from among the plurality of hardware threads; and
an execution pipeline that executes an instruction output from the first selector,
wherein when the multi-thread processor is in a first state, the first thread scheduler selects the first schedule pattern, and when the multi-thread processor is in a second state, the first thread scheduler selects the second schedule pattern, wherein the first thread scheduler comprises:

an interrupt control unit that, when a state of the multi-thread processor is changed from the first state to the second state, outputs a control signal according to an input interrupt signal; and a selection unit that selects the first schedule pattern or the second schedule pattern according to the control signal from the interrupt control unit, and wherein the first state comprising when the multi-thread processor performs a normal operation and the second state comprising the multi-thread processor performing an interrupt processing.

2. A multi-thread processor comprising:

a plurality of hardware threads each of which generates an independent instruction flow;

a first thread scheduler that outputs a thread selection signal in accordance with a plurality of schedule patterns including at least a first schedule pattern and a second schedule pattern, the thread selection signal designating a hardware thread to be executed in a next execution cycle from among the plurality of hardware threads;

a first selector that selects at least one of the plurality of hardware threads according to the thread selection signal and outputs an instruction generated by the selected hardware thread from among the plurality of hardware threads; and an execution pipeline that executes an instruction output from the first selector, wherein when the multi-thread processor is in a first state of operation, the first thread scheduler selects the first schedule pattern, and when the multi-thread processor is in a second state of operation, the first thread scheduler selects the second schedule pattern, the first state comprising when the multi-thread processor performs a normal operation, and the second state comprising the multi-thread processor performing an interrupt processing.

3. A method of a multi-thread processor, the method comprising:

generating, by each of a plurality of hardware threads, an independent instruction flow;

outputting, by a first thread scheduler, a thread selection signal in accordance with a plurality of schedule patterns including at least a first schedule pattern and a second schedule pattern, the thread selection signal designating a hardware thread to be executed in a next execution cycle from among the plurality of hardware threads;

selecting, by a first selector, at least one of the plurality of hardware threads according to the thread selection signal and outputs an instruction generated by the selected hardware thread among the plurality of hardware threads; and executing, by an execution pipeline, an instruction output from the first selector, wherein when the multi-thread processor is in a first state of operation, the first thread scheduler selects the first schedule pattern, and when the multi-thread processor is in a second state of operation, the first thread scheduler selects the second schedule pattern, and wherein the outputting, by a first thread scheduler, comprises:

outputting, by an interrupt control unit, when a state of the multi-thread processor is changed from the first state to the second state, a control signal according to an input interrupt signal; and selecting, by a selection unit, the first schedule pattern or the second schedule pattern according to the control signal from the interrupt control unit, the first state comprising when the multi-thread processor performs a normal operation, and the second state comprising the multi-thread processor performing an interrupt processing.

\* \* \* \* \*